United States Patent
Nagashima et al.

(10) Patent No.: US 7,761,614 B2
(45) Date of Patent: Jul. 20, 2010

(54) ELECTRONIC APPARATUS AND CONTENT DATA PROVIDING METHOD

(75) Inventors: Hirokazu Nagashima, Ome (JP); Mitsuaki Moritani, Yokohama (JP); Yasuhiro Morioka, Kawasaki (JP); Hiroki Iwahara, Inagi (JP); Naomiki Kobayashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/429,471

(22) Filed: Apr. 24, 2009

(65) Prior Publication Data

US 2009/0292830 A1    Nov. 26, 2009

(30) Foreign Application Priority Data

May 20, 2008    (JP)    ............................. 2008-132182

(51) Int. Cl.
    G06F 3/00    (2006.01)
(52) U.S. Cl. ................. 710/13; 710/1; 710/5; 711/147; 711/154; 709/217; 709/218; 709/219; 707/795
(58) Field of Classification Search ............ 710/13, 710/1, 5; 707/100, 104.1, 200, E17.102, 707/795; 711/147, 154; 709/217–219; 1/1
See application file for complete search history.

(56) References Cited

U.S. PATENT DOCUMENTS

| | | | |
|---|---|---|---|
| 6,185,665 B1 * | 2/2001 | Owada et al. ............... | 711/170 |
| 6,778,972 B2 * | 8/2004 | Leonardos ......................... | 1/1 |
| 7,028,058 B2 * | 4/2006 | Russon .............................. | 1/1 |
| 7,209,995 B2 | 4/2007 | Pinto et al. | |
| 7,548,938 B2 * | 6/2009 | Minami ............................. | 1/1 |
| 2001/0006902 A1 | 7/2001 | Ito ............................. | 455/558 |
| 2002/0169004 A1 | 11/2002 | Thil et al. | |
| 2004/0205147 A1 | 10/2004 | Fukuzato | |
| 2005/0138179 A1 | 6/2005 | Encarnacion et al. ....... | 709/227 |
| 2005/0138193 A1 | 6/2005 | Encarnacion et al. ....... | 709/230 |

(Continued)

FOREIGN PATENT DOCUMENTS

JP    2002-91709    3/2002

(Continued)

OTHER PUBLICATIONS

Notice of Grant for Japanese Patent Application No. 2008-132182 filed May 20, 2008.

(Continued)

*Primary Examiner*—Henry W. H. Tsai
*Assistant Examiner*—Steven G Snyder
(74) *Attorney, Agent, or Firm*—Finnegan, Henderson, Farabow, Garrett & Dunner, L.L.P.

(57) ABSTRACT

According to one embodiment, an electronic apparatus is detachably connected to a host apparatus. The electronic apparatus includes a file management information generation module. The file management information generation module generates file management information based on which a host apparatus recognizes each of content data items as a file stored in a storage medium, the file management information being indicative of a plurality of starting storage locations on the storage medium corresponding to starting data blocks of the content data items, and a plurality of shared storage locations on the storage medium, which are shared by the content data items and correspond to second and following data blocks of each of the content data items.

10 Claims, 15 Drawing Sheets

U.S. PATENT DOCUMENTS

| | | | |
|---|---|---|---|
| 2005/0224589 A1 | 10/2005 | Park et al. | 235/492 |
| 2006/0106959 A1* | 5/2006 | Plourde et al. | 710/52 |
| 2006/0241868 A1* | 10/2006 | Sun et al. | 702/19 |
| 2007/0085840 A1* | 4/2007 | Asaka et al. | 345/173 |
| 2007/0198595 A1* | 8/2007 | Obata et al. | 707/200 |
| 2007/0239795 A1* | 10/2007 | Oyanagi et al. | 707/200 |
| 2007/0260881 A1 | 11/2007 | Krasnyanskiy et al. | 713/165 |
| 2007/0288517 A1* | 12/2007 | Takatsuka | 707/104.1 |
| 2008/0154974 A1* | 6/2008 | Obata et al. | 707/200 |
| 2008/0250319 A1* | 10/2008 | Lee et al. | 715/716 |
| 2008/0259751 A1* | 10/2008 | Nakamura et al. | 369/47.13 |
| 2009/0228508 A1* | 9/2009 | Date et al. | 707/102 |
| 2009/0228530 A1 | 9/2009 | Anglin et al. | 1/1 |
| 2009/0292707 A1 | 11/2009 | Moritani et al. | 1/1 |

FOREIGN PATENT DOCUMENTS

| | | | |
|---|---|---|---|
| JP | 2002-345039 | | 11/2002 |
| JP | 2003-8589 | | 1/2003 |
| JP | 2005-080276 | | 3/2005 |
| JP | 2006155417 A | * | 6/2006 |
| JP | 2006-221394 | | 8/2006 |
| JP | 2006-524848 | | 11/2006 |
| JP | 2007-018463 | | 1/2007 |
| JP | 2007-179215 | | 7/2007 |
| JP | 2008-016019 | | 1/2008 |
| JP | 2008-028837 | | 2/2008 |
| JP | 2008-040858 | | 2/2008 |
| JP | 2008176796 A | * | 7/2008 |
| JP | 2009069912 A | * | 4/2009 |

OTHER PUBLICATIONS

Yasuta Morioka, "Device Control Technology for AV Home Network: UPnP AV," *Toshiba Review*, Toshiba Corporation, Jun. 1, 2007, vol. 62, No. 6, pp. 78-79.

* cited by examiner

| Cluster designated by host | Kind (SD/UPnP) | Allocated cluster | URL (UPnP) | Offset |
|---|---|---|---|---|
| Designation of less than 512 | SD | | | |
| | UPnP | 512 | 192.168.2.10:/Data/Video/upnp1 | 0Byte |
| | UPnP | 513 | 192.168.2.11:/contents/Video/upnp2 | 1,000Byte |
| | UPnP | 514 | 192.168.2.11:/contents/Video/upnp3 | 1,800Sec |
| | ... | ... | ... | ... |
| | UPnP | 701-900 | (URL of starting cluster that is read) | 1,500Byte |

F I G. 12

| Name | IP | Class | Capability | MediaFormat | LinkProtection |
|---|---|---|---|---|---|
| Server-A | 192.168.2.10 | Server | -UPL-,-DNL- | MPEG_PS_NTSC,MPEG_TS_J_DTCP | DTCP-IP |
| Server-B | 192.168.2.11 | Server | -DNL- | WMVMED_BASE,WMVHIG_PRO | WMDRM |
| Server-C | 192.168.2.12 | Server | | LPCMS,MP3 | |
| Renderer-D | 192.168.2.13 | Renderer | | MPEG_PS_NTSC,MPEG_TS_DTCP | |
| Controller-E | 192.168.2.14 | Controller | +PUS+,+UPL+,+DNL+ | MPEG4_PS_MP4_SP_AAC,MP3,JPEG | |

F I G. 13

| File system | UPnP content |
|---|---|
| File name | Title (conversion to 8.3 format) → according to respective rules under SD_VIDEO/DCIF/SD_AUDIO |
| Attribute | In case where content can be made public, "read-only", "archive", or the like is set as attribute |
| Creation date | Date of acquisition, if not obtainable by browse |
| Last access date | Date of acquisition, if not obtainable by browse |
| Update date | Date of acquisition, if not obtainable by browse |
| Starting cluster number | Dummy file for network is created on SD card, and cluster thereof is set |
| File length | For example, only content with size, which is displayable in 4 bytes, is handled |

FIG. 14

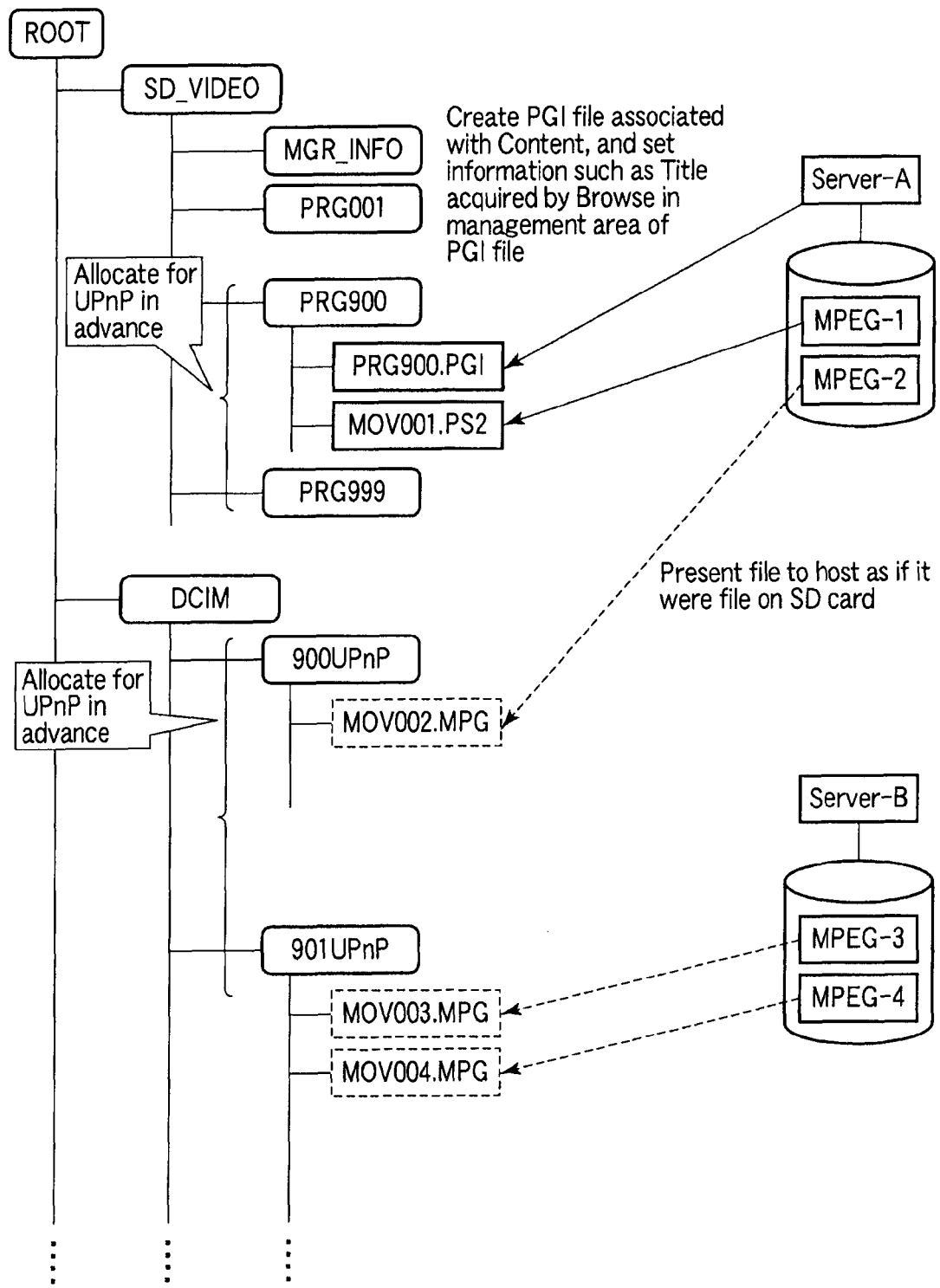
F I G. 15

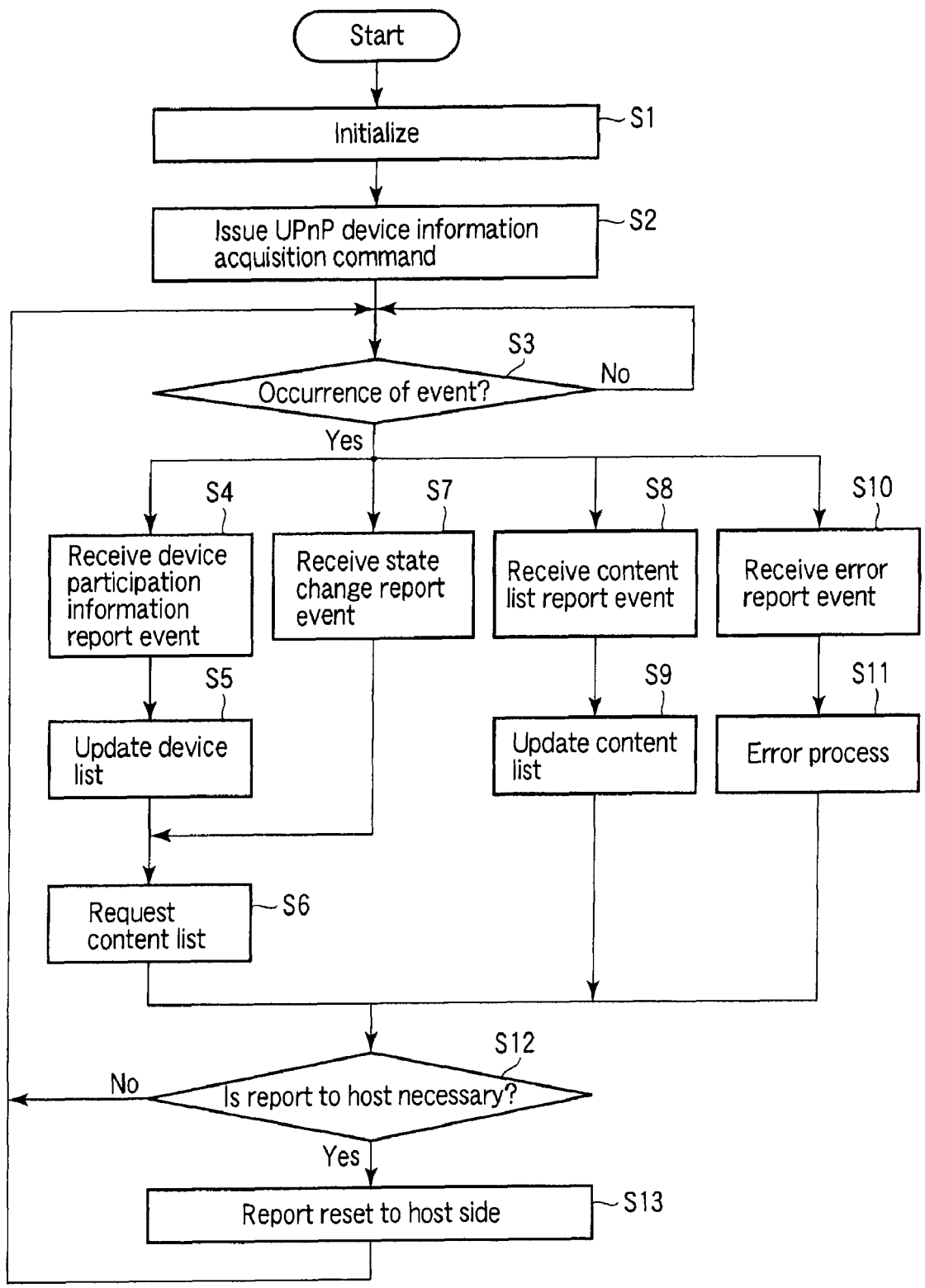
F I G. 18

ELECTRONIC APPARATUS AND CONTENT DATA PROVIDING METHOD

CROSS-REFERENCE TO RELATED APPLICATIONS

This application is based upon and claims the benefit of priority from Japanese Patent Application No. 2008-132182, filed May 20, 2008, the entire contents of which are incorporated herein by reference.

BACKGROUND

1. Field

One embodiment of the invention relates to an electronic apparatus which is connected to a host apparatus to expand the function of the host apparatus, and a content data providing method using the electronic apparatus.

2. Description of the Related Art

In recent years, the development has been progressed rapidly for the environment for interconnecting and using digital TV apparatuses, video recorders, computers, etc. In this environment, a user can view, for example, TV broadcast program data, which has been recorded in a video recorder, by using a personal computer.

Under the circumstances, various proposals have been made on the function of enabling viewing of data, which is recorded in a video recorder, for example, on a personal computer, in the same manner as viewing of data, which is recorded in a personal computer, on the personal computer. For example, a system disclosed in Jpn. PCT National Publication No. 2006-524848 makes use of a UPnP (universal plug and play) control point having an expanded file system/service, thereby to make visible the content data within a UPnP (universal plug and play) media server.

In addition, recently, the interconnection of digital electric appliances over a wireless LAN has widely been practiced. In this case, since TV broadcast program data, for example, which is recorded in a video recorder, can be transferred cablelessly to other devices, such as personal computers, the user can enjoy movies, etc. anywhere he/she wants.

However, in order to take content, which is recorded in a digital electric appliance, into a certain device by wireless communication and play back the content, it is necessary to newly equip the device with a wireless communication function and a UPnP (universal plug and play) function. Thus, even in the case of a device having a function of playing back content, it is necessary to largely improve the operating system of the device itself or the file service function of the operating system, thereby to enable easy use of the content data within an external device such as a digital electric appliance.

Under the circumstances, there has been a demand for the realization of a novel function which enables a conventional existing device to handle content data within an external device, without improving the conventional existing device. Besides, the data size of content data, such as video data or audio data, is relatively large. It is thus necessary to realize a novel function for handling a plurality of content data by using a minimum possible resource.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 12 shows an example of file list information which is managed by the electronic apparatus according to the present embodiment;

FIG. 13 shows an example of device list information which is managed by the electronic apparatus according to the present embodiment;

FIG. 14 is an exemplary view for explaining conversion rules which are used by the electronic apparatus according to the present embodiment;

FIG. 15 is an exemplary view for explaining a process of allocating video data on an external device to a file system, which is executed by the electronic apparatus according to the present embodiment;

FIG. 18 is an exemplary flowchart illustrating the procedure of a content information collection process which is executed by the electronic apparatus according to the present embodiment;

DETAILED DESCRIPTION

Various embodiments according to the invention will be described hereinafter with reference to the accompanying drawings. In general, according to one embodiment of the invention, there is provided an electronic apparatus detachably connected to a host apparatus, comprising: a wireless communication device configured to execute wireless communication with at least one external device; an information acquisition module configured to acquire, by wireless communication with the at least one external device, metadata corresponding to each of content data items which the at least one external device is able to provide; a file management information generation module configured to generate, based on each of the acquired metadata, file management information based on which the host apparatus recognizes each of the content data items as a file stored in a storage medium in the electronic apparatus, the file management information being indicative of a plurality of starting storage locations on the storage medium corresponding to starting data blocks of the content data items, and a plurality of shared storage locations on the storage medium, which are shared by the content data items and correspond to second and following data blocks of each of the content data items; and an access control module configured to acquire, when the access control module has received a first read request designating one of the plurality of starting storage locations, which is sent from the host apparatus based on the file management information, the content data item corresponding to the designated starting storage location from the at least one external device with use of the wireless communication device, and to output the starting data block of the acquired content data item to the host apparatus, and configured to output, when one of the plurality of shared storage locations is designated by a subsequent second read request from the host apparatus, the data block in the acquired content data item, which corresponds to the designated shared storage location, to the host apparatus.

Figure 1:
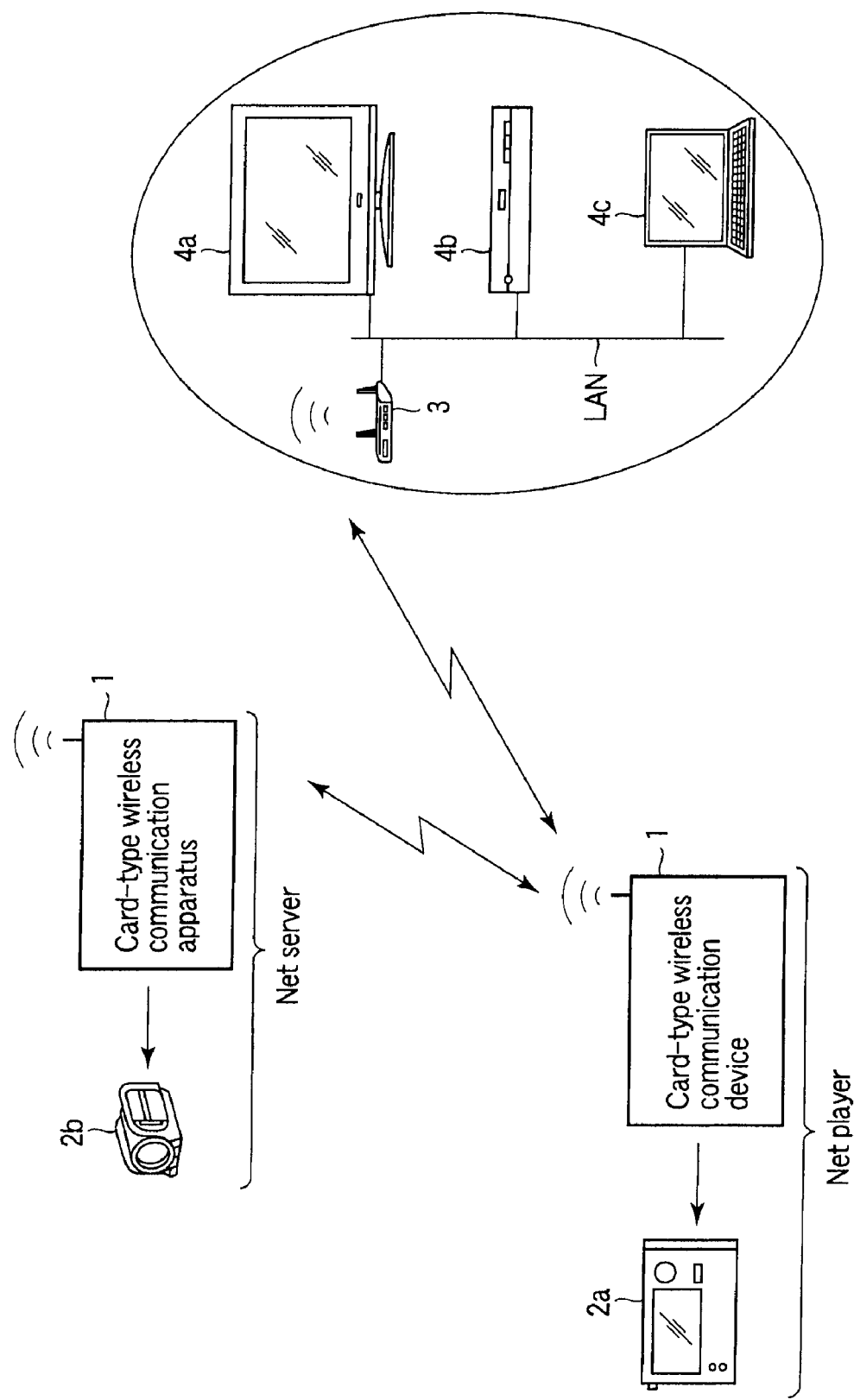
FIG. 1 is an exemplary block diagram showing a configuration of a network system which makes use of an electronic apparatus according to an embodiment of the invention.

FIG. 1 shows an example of the structure of a network system which makes use of an electronic apparatus according to an embodiment of the present invention. This network system is a home network system for interconnecting household digital devices, such as a consumer electronic device, a portable device and a personal computer. The electronic apparatus is a device which is configured to be detachably connected to a host apparatus such as a portable device or a personal computer. This electronic apparatus 1 is realized, for instance, as a card-type wireless communication apparatus 1. The card-type wireless communication apparatus 1 has a wireless communication function, such as a wireless LAN, and a content networking function of acquiring content data from an external device according to, e.g. UPnP. The host apparatus to which the card-type wireless communication apparatus 1 is attached is wirelessly connected to an external device such as a media server, and the host apparatus can handle video data, audio data or other content data, which is held in the external device.

For example, as shown in FIG. 1, in the case where the card-type wireless communication apparatus 1 is connected to a portable AV player 2a, the portable AV player 2a can function as a net player (also referred to as "UPnP media player") which can acquire content data from the external device, such as a UPnP media server, and can plays back the acquired content data. In addition, in the case where the card-type wireless communication apparatus 1 is connected to a digital camera 2b, the digital camera 2b can function as a net server (UPnP media server) which can provide content data, such as a still image or a moving image, which is obtained by image-capturing that is executed by the digital camera 2b, to the net player.

The card-type wireless communication apparatus 1 is composed of a small-sized card device such as an SD card, and can be loaded in card slots of various portable devices. The card-type wireless communication apparatus 1 has a predetermined file system. The host apparatus, that is, the portable device in which the card-type wireless communication apparatus 1 is loaded, can recognize the card-type wireless communication apparatus 1 as a storage device, for instance, a removable storage device.

In the home network system shown in FIG. 1, each of a digital TV 4a, a video recorder 4b and a personal computer 4c has a UPnP function. Each of the digital TV 4a, video recorder 4b and personal computer 4c can function as a UPnP media server, or a UPnP media player, or both the UPnP media server and UPnP media player.

The digital TV 4a, video recorder 4b and personal computer 4c are connected to a network such as a LAN. A wireless access point 3 is also connected to this network. The card-type wireless communication apparatus 1 can execute wireless communication with each of the devices 4a, 4b and 4c on the network via the wireless access point 3. In the meantime, each of the digital TV 4a, video recorder 4b and personal computer 4c may have a wireless function.

Figure 2:
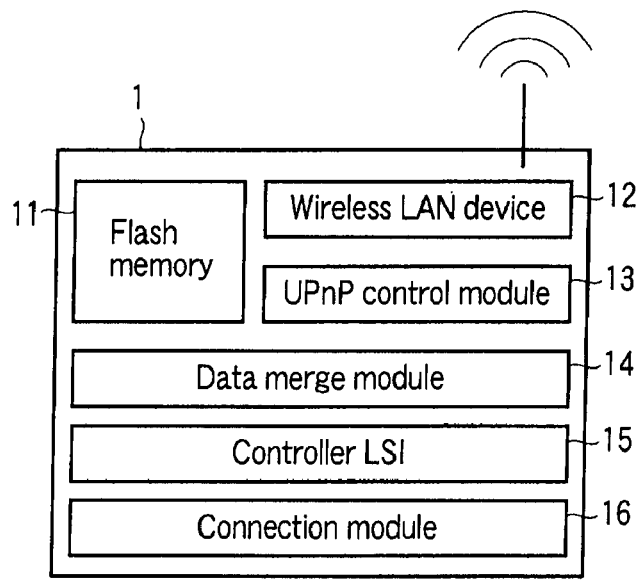
FIG. 2 is an exemplary block diagram showing a configuration of the electronic apparatus according to the embodiment.

FIG. 2 shows an example of the structure of the card-type wireless communication apparatus 1.

In FIG. 2, it is assumed that the card-type wireless communication apparatus 1 is realized by an SD card which functions as a removable storage device.

The card-type wireless communication apparatus 1 includes a flash memory 11, a wireless LAN device 12, a UPnP control module, 13, a data merge module 14, a controller LSI 15 and a connection module 16.

The flash memory 11 is a nonvolatile memory device such as a flash EEPROM, and can store various data. The flash memory 11 is used as a storage medium of the card-type wireless communication apparatus 1. Files which are stored in the flash memory 11 are managed by a file system such as a FAT file system.

File management information (also referred to as "file system information") for managing the files stored in the flash memory 11 is stored in the flash memory 11. Specifically, the flash memory 11 includes a data storage area and a file management information storage area. The data storage area is a memory area for storing files. The file management information storage area is a storage area for storing the file management information for managing the files stored in the data storage area.

The file management information includes directory entry information corresponding to each of the files, and file allocation table (FAT) information which is indicative of a storage location on the data storage area, where each of the files is stored. The directory entry information corresponding to each file includes the file name of a corresponding file, the attribute of the file, the file creation date/time of the file, the file size of the file, and the starting cluster number of the file. The starting cluster number is a cluster number of a cluster (storage location) where the starting data block of the file is stored. The file allocation table information includes information for managing the storage location of the file on the flash memory 11 in units of a predetermined data size (in units of a data block), such as a cluster, on a file-by-file basis. Specifically, the file allocation table information is indicative of a plurality of storage locations (a plurality of cluster numbers) on the flash memory 11, where a plurality of data blocks constituting a file are stored, and the chain of these plural storage locations (cluster numbers). One data block corresponds to one cluster. The storage location of each of the plural data blocks constituting a file is indicated by the number of the cluster where this data block is stored. One cluster is composed of at least one sector.

A file service program, which is included in the operating system of the host apparatus, can access each file stored in the flash memory 11, by referring to the file management information of the card-type wireless communication apparatus 1.

The wireless LAN device 12 is a wireless communication device which executes wireless communication with the external device. The wireless LAN device 12 executes wireless communication with the external device, for example, according to the IEEE.801 standard. The UPnP control module 13 executes communication with each of the external devices on the home network by using the wireless LAN device 12. The UPnP control module 13 executes a process of discovering an external device such as a UPnP media server, and a process of collecting content data (video data, audio data, image data, etc.) which the discovered external device can provide, or metadata of the content data. The metadata is information indicative of characteristics (properties) of the corresponding content data, and the metadata includes information relating to, for instance, the title of the corresponding content data, the data size of the content data, the artist name of the content data, the date of creation of the content data, and the content protection method that is set in the content data.

The data merge module 14 generates file management information (file management information for UPnP content) for causing the content data, which the UPnP media server can provide, to appear on the host apparatus as if this content data were a file stored in the card-type wireless communication apparatus 1. Based on the file management information (file management information for UPnP content), the host apparatus recognizes the content data held in the UPnP media server as a file stored in the card-type wireless communication apparatus 1. Although the entity of content data exists in the UPnP media server, the content data is managed by the file management information as a file (virtual file) stored in the flash memory 11. This file management information (file management information for UPnP content) has the same data structure as the above-described file management information (file management information for SD) for managing files which are actually stored in the data storage area of the flash memory 11. In order to manage the content data as a virtual file, the file management information for UPnP content includes directory entry information relating to the file (virtual file) corresponding to the content data, and file allocation table information relating to the file corresponding to the content data. This file allocation table information includes information which is indicative of a plurality of storage locations on the flash memory 11, which correspond to a plurality of data blocks constituting the file corresponding to the content data.

The data merge module 14 generates single file management information by merging the file management information for SD for managing ordinary files, whose entities are actually stored in the flash memory 11, and the generated file management information for UPnP content, and provides the generated single file management information to the host apparatus. Thereby, the host apparatus can handle both the content data, which is present on the UPnP media server, and the files, which are actually stored in the flash memory 11, as files which are present on the flash memory 11. In other words, the host apparatus recognizes each content data, which is present on the UPnP media server, as a file which is present on the flash memory 11.

The controller LSI 15 executes, e.g. read/write access to the flash memory 11 in accordance with a memory access command from the host apparatus, which is received via the connection module 16. The connection module 16 is an interface module which executes interface with the host apparatus. The connection module 16 is used in order to link the wired communication path between the host apparatus and the card-type wireless communication apparatus 1. In the state in which the card-type wireless communication apparatus 1 is attached to the host apparatus, the connection module 16 is electrically and physically connected to the host apparatus. The connection module 16 executes communication with the host apparatus, thereby executing, e.g. reception of commands and data from the host apparatus and transmission of data to the host apparatus.

Figure 3:
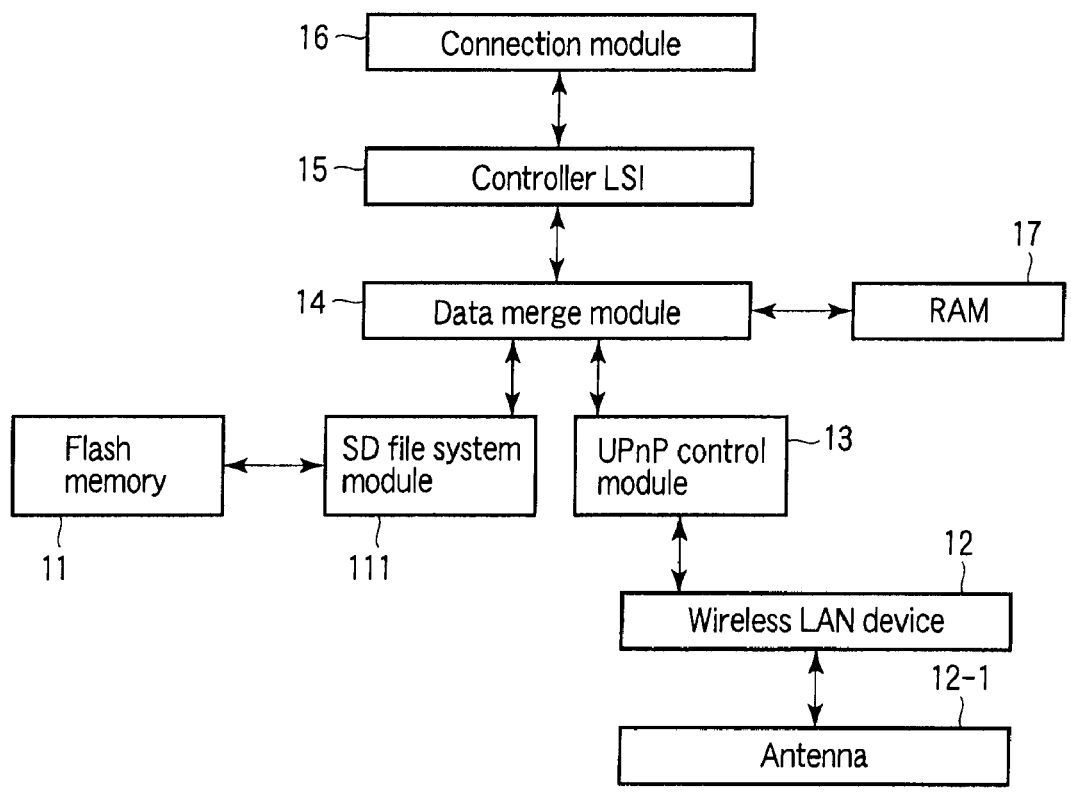
FIG. 3 is an exemplary block diagram showing a concrete example of the structure of the electronic apparatus according to the embodiment.

FIG. 3 shows a concrete example of the structure of the card-type wireless communication apparatus 1.

In the structure shown in FIG. 3, the data merge module 14 is disposed between the controller LSI 15 and the flash memory 11. The data merge module 14 executes a process of merging, as a single file system, the file management information (file management information for SD files), which is acquired from the flash memory 11 via a file system module 111, and the file management information (file management information for UPnP content) corresponding to the content data which is acquired from the media server by the UPnP control module 13.

In the case where the data merge module 14 receives a read request from the host apparatus via the controller LSI 15, the data merge module 14 executes a process of switching the access destination between the flash memory 11 and the media server.

Specifically, if the storage location (e.g. cluster number) of the to-be-read data block, which is designated by the read request that is sent from the host apparatus, belongs to the range of storage locations which are managed by the file allocation table information (FAT information) in the file management information for SD, the data merge module 14 accesses the flash memory 11. In this case, the data merge module 14 reads, from the storage location on the data storage area of the flash memory 11 which is designated by the read request, the data block of the file, whose entity is actually present in this data storage area, and outputs the read data block to the host apparatus.

On the other hand, if the storage location (e.g. cluster number) of the to-be-read data block, which is designated by the read request that is sent from the host apparatus, belongs to the range of storage locations which are managed by the file management information for UPnP content, the data merge module 14 executes, with use of the wireless LAN device 12, an external device access process for acquiring content data from the media server. The wireless LAN device 12 is connected to an antenna 12-1 which is provided within the card-type wireless communication apparatus 1.

In the external device access process, for example, the data merge module 14 acquires content data from the media server, and stores the acquired content data in a RAM 17 serving as a buffer or in the data storage area of the flash memory 11. The data merge module 14 outputs, to the host apparatus, only the data block in the content data, which corresponds to the storage location designated by the read request from the host apparatus.

In the meantime, the data merge module 14 may acquire, from the media server, only the data block in the content data, which corresponds to the storage location designated by the read request from the host apparatus. Besides, the data merge module 14 may acquire, from the media server, a predetermined number of data blocks beginning with the data block in the content data, which corresponds to the storage location designated by the read request from the host apparatus.

Figure 4:
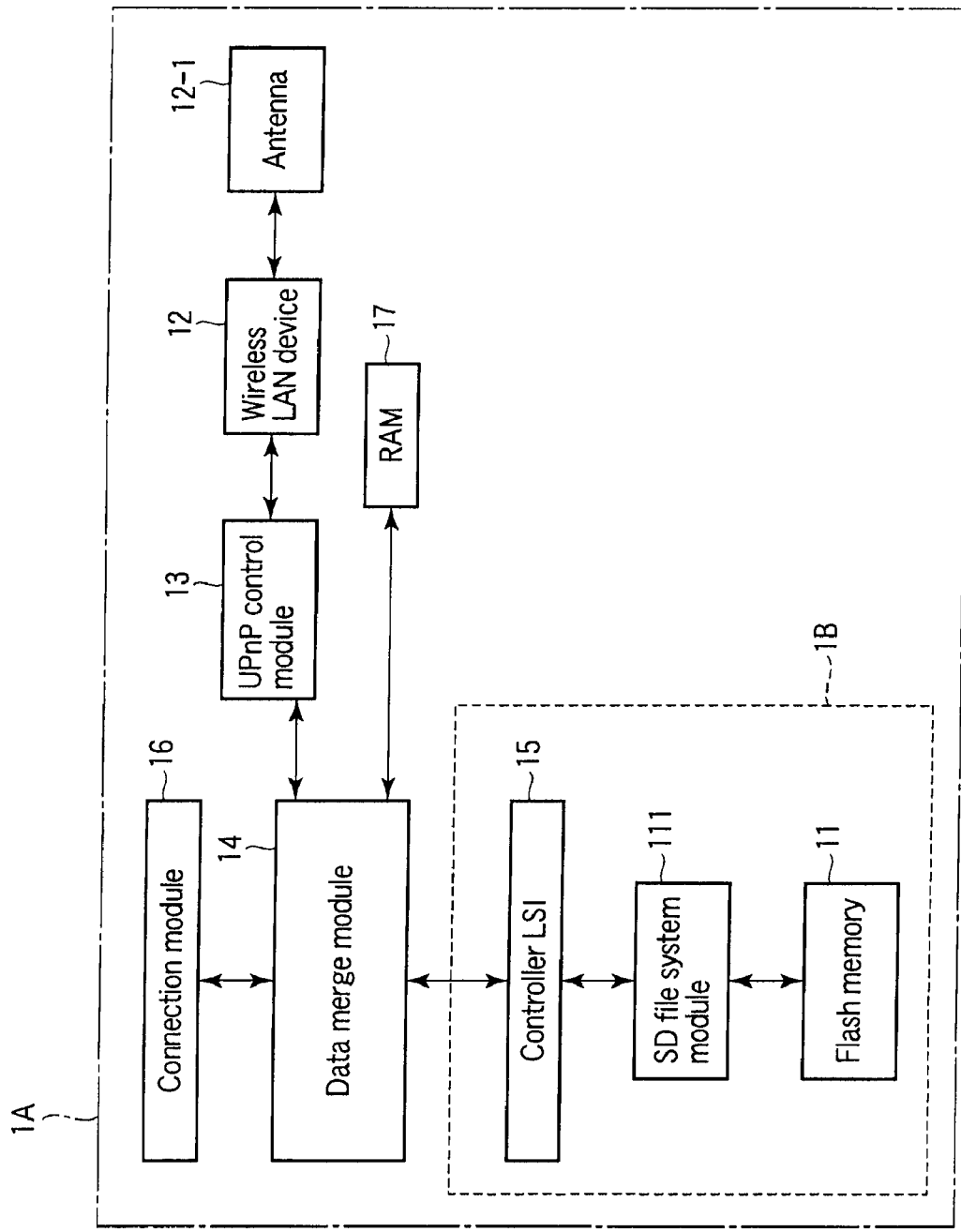
FIG. 4 is an exemplary block diagram showing another concrete example of the structure of the electronic apparatus according to the embodiment.

FIG. 4 shows another example of the concrete structure of the card-type wireless communication apparatus 1.

In the structure shown in FIG. 4, the data merge module 14 is disposed between the connection module 16 and the controller LSI 15. A module 1B including the controller LSI 15, SD file system module 111 and flash memory 11 has substantially the same structure as an ordinary memory card (e.g. MINI, SD card, Micro SD card, etc.). Thus, in the case where the structure of FIG. 4 is adopted, a module 1A, which includes the connection module 16, data merge module 14, UPnP control module 13, wireless LAN device 12, antenna 12-1 and RAM 17, can be realized as an adapter in which an ordinary memory card is detachably mounted.

Figure 5:
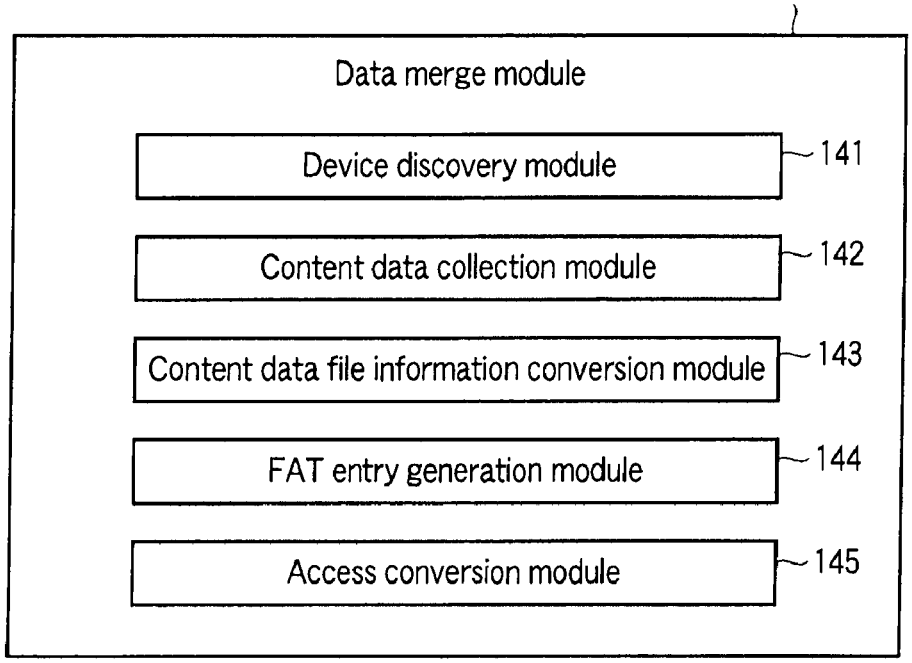
FIG. 5 is an exemplary block diagram showing a configuration of a data merge module which is provided in the electronic apparatus according to the embodiment.

FIG. 5 shows the structure of the data merge module 14.

The data merge module 14 includes a device discovery module 141, a content data collection module 142, a content data file information conversion module 143, a FAT entry generation module 144 and an access conversion module 145.

The device discovery module 141 executes, in cooperation with the UPnP control module 13, a device discovery process for discovering an external device (UPnP device) which is present on the network. By the device discovery process, a device (media server), which is wirelessly connectable to the wireless LAN device 12 and which can provide content data, is discovered. The device discovery process is also called "browsing process". Actually, in the device discovery process, not only the media server, but also the above-described media player, a device (media renderer) having a function of playing back or rendering content data, and a device (media controller), which sets up connection between the media server and the media renderer, are discovered.

The device discovery module 141 manages device classes corresponding to the discovered devices (media server, media player, media renderer, and media controller), net addresses of the discovered devices and the capabilities of the discovered devices, by using device list information as shown in FIG. 13. Specifically, as shown in FIG. 13, the device discovery module 141 manages the ID (name) of each UPnP device, the IP address of each UPnP device, the class of each UPnP device (media server, media controller, media renderer, etc.), the capability of each UPnP device ("DNL": capable of downloading content data; "UPL": capable of uploading content data; blank: capable of streaming content data), the kind of media format corresponding to the UPnP device, and the kind of content protection system (DTCP, WMDRM, etc.) corresponding to the UPnP device.

The content data collection module 142 collects content information held by each device, from each media server which has been discovered by the device discovery module 141, and manages the collected content information. Specifically, the content data collection module 142 executes an information acquisition process for acquiring, by wireless communication with the media server, the metadata corresponding to the content data which the media server can provide. By this information acquisition process, the content data collection module 142 generates information indicative of the list of available content data.

The content data file information conversion module 143 generates file management information (file management information for UPnP content) in cooperation with the FAT entry generation module 144. The file management information (file management information for UPnP content) is information for managing the usable content data as if the usable content data is stored the flash memory 11, and for allowing the host apparatus to recognize the usable content data as a file stored the flash memory 11. More specifically, to make content data look like a file stored in the flash memory 11, the content data file information conversion module 143 generates directory entry information representing the file name, attribute, creation date/time, size, and the like of the file based on the metadata of the content data. In this case, if information necessary for generating the directory entry information is deficient, a process for supplementing the deficient information is automatically executed.

Figure 6:
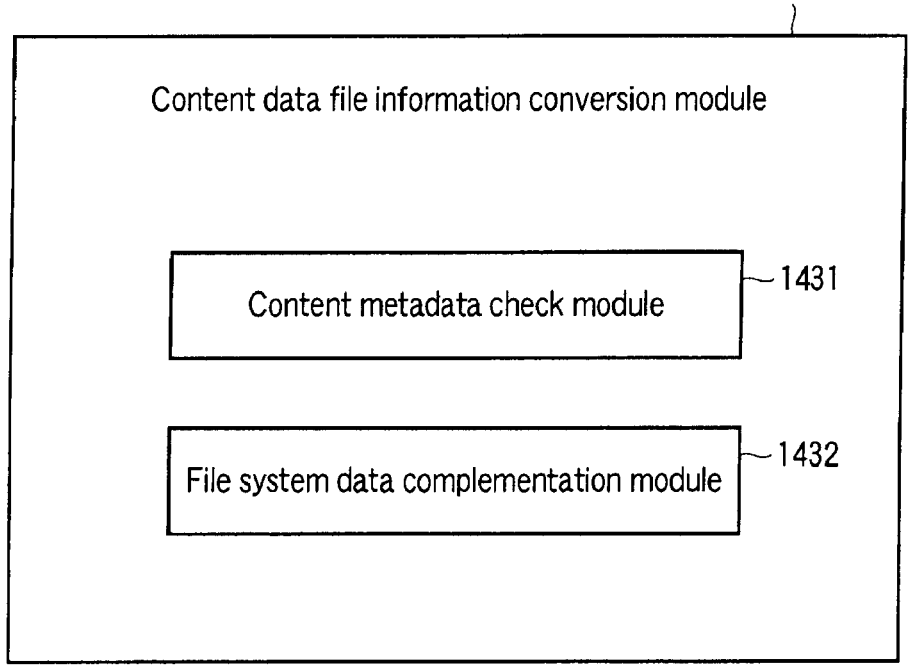
FIG. 6 is an exemplary block diagram showing a configuration of a content data file information conversion module which is provided in the data merge module shown in FIG. 5.

Specifically, as shown in FIG. 6, the content data file information conversion module 143 includes a content metadata check module 1431 and a file system data supplementing module 1432. The content metadata check module 1431 checks the metadata, and extracts, from the metadata, the information (e.g. title, attribute, data size, etc.) which is usable for generating the directory entry information of the file corresponding to the content data. The file system data supplementing module 1432 executes a process of editing the extracted information, and a process of supplementing the deficient information.

The directory entry information, which is generated by the content data file information conversion module 143, is added to a directory table on the file management information storage area of the flash memory 11.

The FAT entry generation module 144 generates file allocation table information for managing, in units of a data block such as a cluster, the storage location of the file corresponding to the content data. This file allocation table information is indicative of a plurality of storage locations (a plurality of cluster numbers) corresponding to a plurality of data blocks, respectively, which constitute the file corresponding to the content data, by using cluster numbers belonging to a predetermined cluster number range allocated to the file corresponding to the content data. The file allocation table information, which is generated by the FAT entry generation module 145, is added to a file allocation table on the file management information storage area of the flash memory 11.

Figure 7:
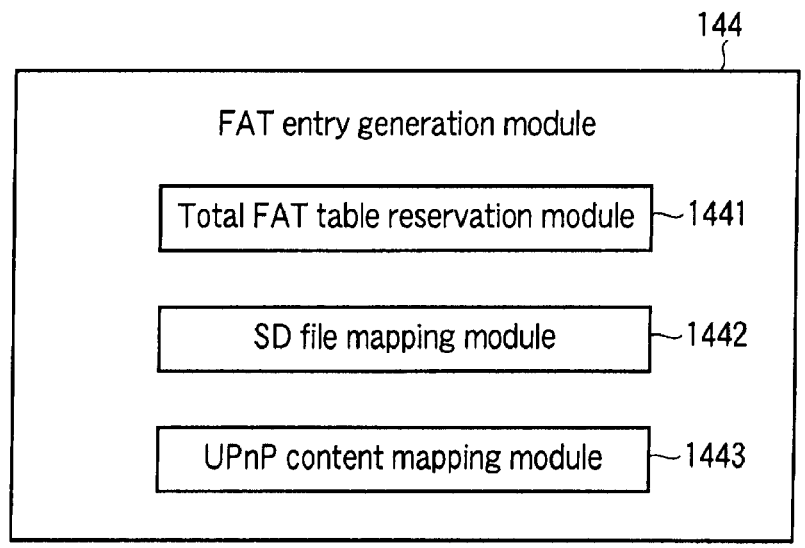
FIG. 7 is an exemplary block diagram showing a configuration of a FAT entry generation module which is provided in the data merge module shown in FIG. 5.

The FAT entry generation module 144, as shown in FIG. 7, includes a total FAT table reservation module 1441, an SD file mapping module 1442 and an UPnP content mapping module 1443. The total FAT table reservation module 1441 determines and secures the size of the FAT table, which is necessary as a whole, on the basis of the file management information (file management information for SD) that is acquired from the flash memory 11, and the file management information (file management information for UPnP content) corresponding to the content data that is acquired from the media server by the UPnP control module 13. The SD file mapping module 1442 maps the file management information for SD on an SD area in the FAT table which is secured by the total FAT table reservation module 1441. On the other hand, the UPnP content mapping module 1443 maps the file management information for UPnP content on a UPnP area in the FAT table which is secured by the total FAT table reservation module 1441.

In the present embodiment, in order to share the cluster numbers between a plurality of content data, the file allocation table is divided into a starting FAT area and a shared FAT area which is shared between content data items. In the starting FAT area, entries corresponding to respective content data are allocated. These entries are indicative of a plurality of storage locations (starting storage locations) on the flash memory 11, which correspond to starting data blocks of the respective content data. In the shared FAT area, a plurality of entries, which are shared between content data items, are allocated, and these entries are indicative of a plurality of storage locations (shared storage locations) on the flash memory 11, which correspond to the second and following data blocks of the respective content data. In this manner, unique storage locations are allocated to the starting data blocks in association with individual content data, while common storage locations are allocated to the second and following data blocks between the content data items. Thus, the cluster numbers indicative of the storage locations of the second and following data blocks are shared between a plurality of content data items.

The access conversion module 145 shown in FIG. 5 manages, with use of a management table as shown in FIG. 12, the range of storage locations allocated to the files (SD files) which are actually stored in the data storage area of the flash memory 11, and the range of storage locations allocated to the files corresponding to the respective UPnP content data. The access conversion module 145 determines, with use of the management table as shown in FIG. 12, a file that corresponds to the storage location range, to which the storage location designated by the access request from the host apparatus belongs. On the basis of the determination result, the access conversion module 145 switches the object of access between the flash memory 11 and each of plural media servers.

A description is given of the access operation to the content data.

In the case where a read request received from the host apparatus designates one of a plurality of starting storage locations corresponding to a plurality of content data, the access conversion module 145 acquires the content data corresponding to the designated starting storage location from the external device by using the wireless communication module 12, and outputs the starting data block of the acquired content data to the host apparatus. In this case, each of the second and following data blocks of the acquired content data can be stored in the RAM 17 or in the data storage area of the flash memory 11. If one of a plurality of shared storage locations is designated by a subsequent read request from the host apparatus, the access conversion module 145 reads the data blocks in the above-described acquired content data, which corresponds to the designated shared storage location, from the RAM 17 or the data storage area of the flash memory 11, and outputs the read data blocks to the host apparatus.

In the case where each of the second and following data blocks is stored in the data storage area of the flash memory 11, the respective second and following data blocks may be stored at the plural shared storage locations on the data storage area of the flash memory 11. In this case, if one of the plural shared storage locations is designated by the read request from the host apparatus, the access conversion module 145 may read the data block from the designated shared storage location and output the read data block to the host apparatus.

In another method, when available content data is discovered, the data merge module 14 may acquire the starting data block of the content data from the external device, and may store the acquired starting data block in the data storage area of the flash memory 11. In this case, the storage location on the data storage area, where the starting data block is stored, is the starting storage location corresponding to the content data. Specifically, the starting data block is stored at the storage position on the data storage area, which is indicated by the cluster number that is indicated by the entry in the starting FAT area corresponding to the content data. In the case where a read request received from the host apparatus designates one of a plurality of starting storage locations, the access conversion module 145 outputs the starting data block, which is stored at the designated starting storage location, to the host apparatus, and acquires each of the second and following data blocks of the content data, which corresponds to the designated starting storage location, from the external device by using the wireless communication module 12. The acquired data blocks are stored at a plurality of storage locations on the data storage area, which are indicated by a plurality of shared storage locations. In the case where one of a plurality of shared storage locations is designated by a subsequent read request from the host apparatus, the access conversion module 145 reads the data block which is stored at the designated shared storage location, and outputs the read data block to the host apparatus. The second and following data blocks, which are acquired from the external device, may be stored in the RAM 17, and not in the flash memory 11.

Figure 8:
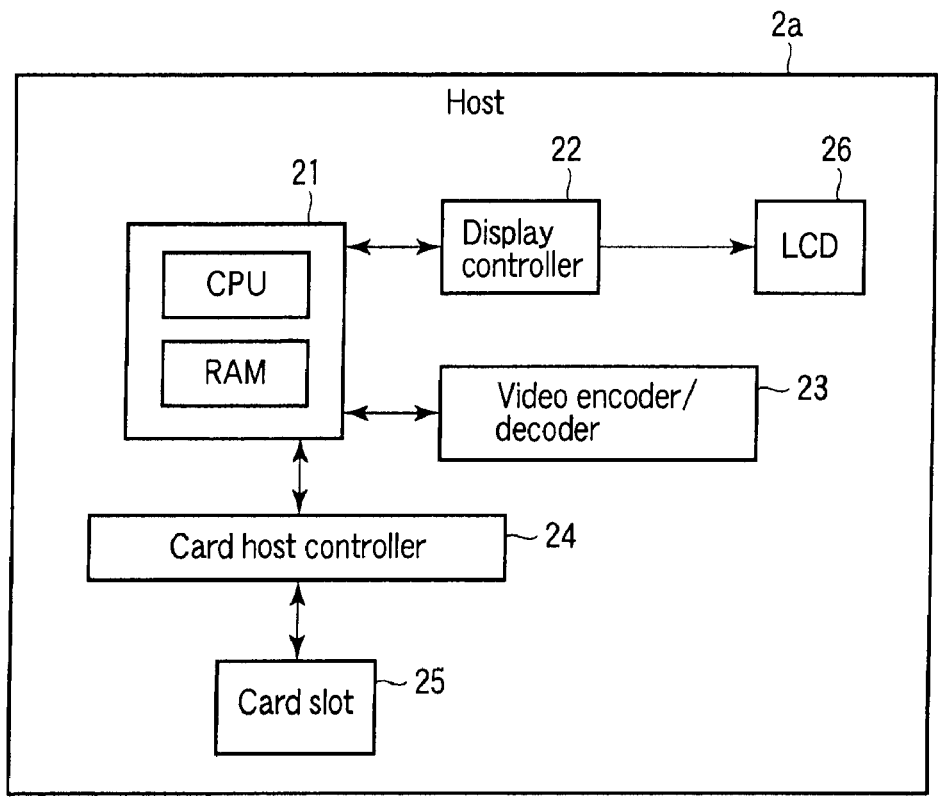
FIG. 8 is an exemplary block diagram showing a configuration of a host apparatus to which the electronic apparatus according to the present embodiment is connected.

FIG. 8 shows an example of the structure of the host apparatus.

It is assumed that the host apparatus is the portable AV player 2a shown in FIG. 1. The host apparatus 2a includes a main controller 21, a display controller 22, a video encoder/decoder 23, a card host controller 24, a card slot 25, and a display device 26 such as an LCD.

The main controller 21 controls the operation of the host apparatus 2a. The main controller 21 is composed of a CPU and a RAM. The CPU is a processor which executes various programs. The programs, which are executed by the CPU, include an operating system, and an application program for playing back video data, audio data and image data. The operating system includes a file service program. The operating system reads the file management information from the card device, which is loaded in the card slot 25, via the file service program, and issues, e.g. an access request (read/write/seek) to the card device according to the file management information.

The display controller 22 executes a rendering process, and generates a video signal which forms a display image that is to be displayed on the display screen of the display device 26. The video encoder/decoder 23 executes a process for compression-encoding video data, and a process for decoding compression-encoded video data. The card host controller 24 is a controller which controls the card device, such as an SD card, which is loaded in the card slot 25.

In the case where the card-type wireless communication device 1 according to the present embodiment is inserted into the card slot 25, the host apparatus 2a can use not only files which are actually stored in the card-type wireless communication device 1, but also content data which is held by the external device on the home network. The card-type communication apparatus 1 stores file management information based on which the host apparatus 2a recognizes the files stored in the card-type communication apparatus 1 and the content data held by the external devices as one file system. By referring to the file management information, the host apparatus 2a can access the content data held by the external devices as if they were files stored in the card-type communication apparatus 1.

When the card-type wireless communication device 1 is loaded in the card slot 25, the card host controller 24 detects the loading (attachment) of the card-type wireless communication device 1, and informs the main controller 21 of the occurrence of an event of loading of the card device. The main controller 21 reads the file management information from the card-type communication device 1 via the card host controller 24, and mounts, on the basis of the file management information, the card-type wireless communication apparatus 1 (SD card) in the file system that is managed by the operating system of the host apparatus 2a.

Subsequently, if the file (the file that is actually stored in the card-type wireless communication apparatus 1, or the content data (virtual file) that is held by the external device), which is managed by the file management information of the card-type wireless communication apparatus 1, is selected by the user's operation, the main controller 21 sends a read request for reading the selected file to the card-type wireless communication apparatus 1 via the card host controller 24. If the file, which is designated by the read request, is the file that is actually stored in the flash memory 11 of the card-type wireless communication apparatus 1, the data of the file is read out of the flash memory 11 and is sent from the card-type wireless communication apparatus 1 to the host apparatus 2a. On the other hand, if the file, which is designated by the read request, is the file corresponding to the content data that is present on the external device, wireless communication is executed between the card-type wireless communication apparatus 1 and the external device, and the content data is acquired from the external device. The acquired content data is sent from the card-type wireless communication apparatus 1 to the host apparatus 2a.

If the file (the file that is actually stored in the card-type wireless communication apparatus 1, or the content data (virtual file) that is possessed by the external device), which is read from the card-type wireless communication apparatus 1, is video data, the video data is decoded by the video encoder/decoder 23. The decoded video data is displayed on the display screen of the display device 26 by the display controller 22.

Figure 9:
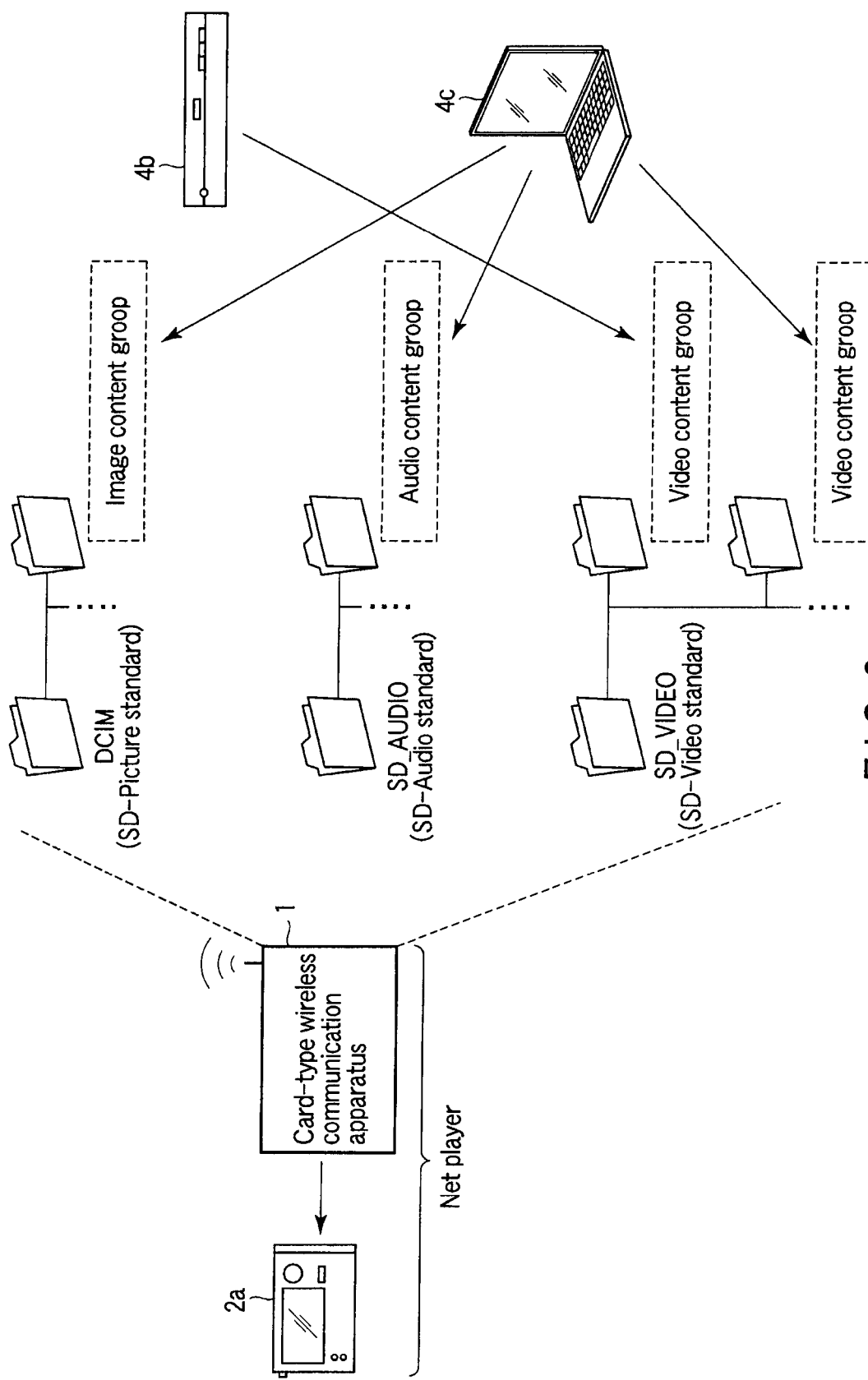
FIG. 9 is an exemplary view showing how the electronic apparatus according to the present embodiment manages content data as a file.

FIG. 9 is a conceptual view showing how the card-type wireless communication apparatus 1, which is loaded in the portable AV player 2a, causes the content data, which the video recorder 4b and personal computer 4c functioning as UPnP media servers can provide, to appear on the portable AV player 2a that is the host apparatus, as if these data were files stored in the flash memory 11 of the own apparatus (card-type wireless communication apparatus 1).

In the SD card standard, it is stipulated that the respective kinds of content data, i.e. image data, audio data and video data, are disposed under the "DCIM" directory (SD-Picture standard), "SD_AUDIO" directory (SD-Audio standard) and "SD_VIDEO" directory (SD-Video standard) according to the kinds. The data merge module 14 executes update control of file management information containing directory entry information and a file allocation table for each content data to make the host apparatus recognize as if image data providable by a UPnP media server were present under the "DCIM" directory, audio data providable by a UPnP media server were present under the "SD_AUDIO" directory, and video data providable by a UPnP media server were present under the "SD_VIDEO" directory. A detailed method of assigning image data, audio data, and video data under the predetermined directories will be described later.

Figure 10:
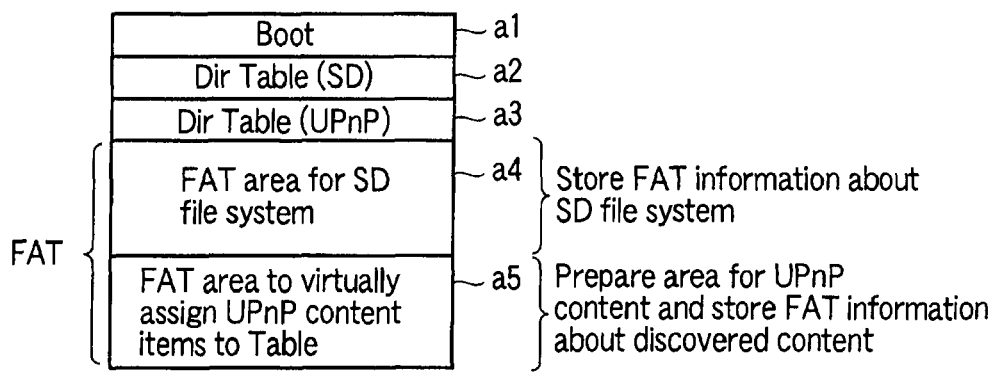
FIG. 10 shows a data structure in a file management information storage area of a storage medium which is provided in the electronic apparatus according to the present embodiment.
Figure 11:
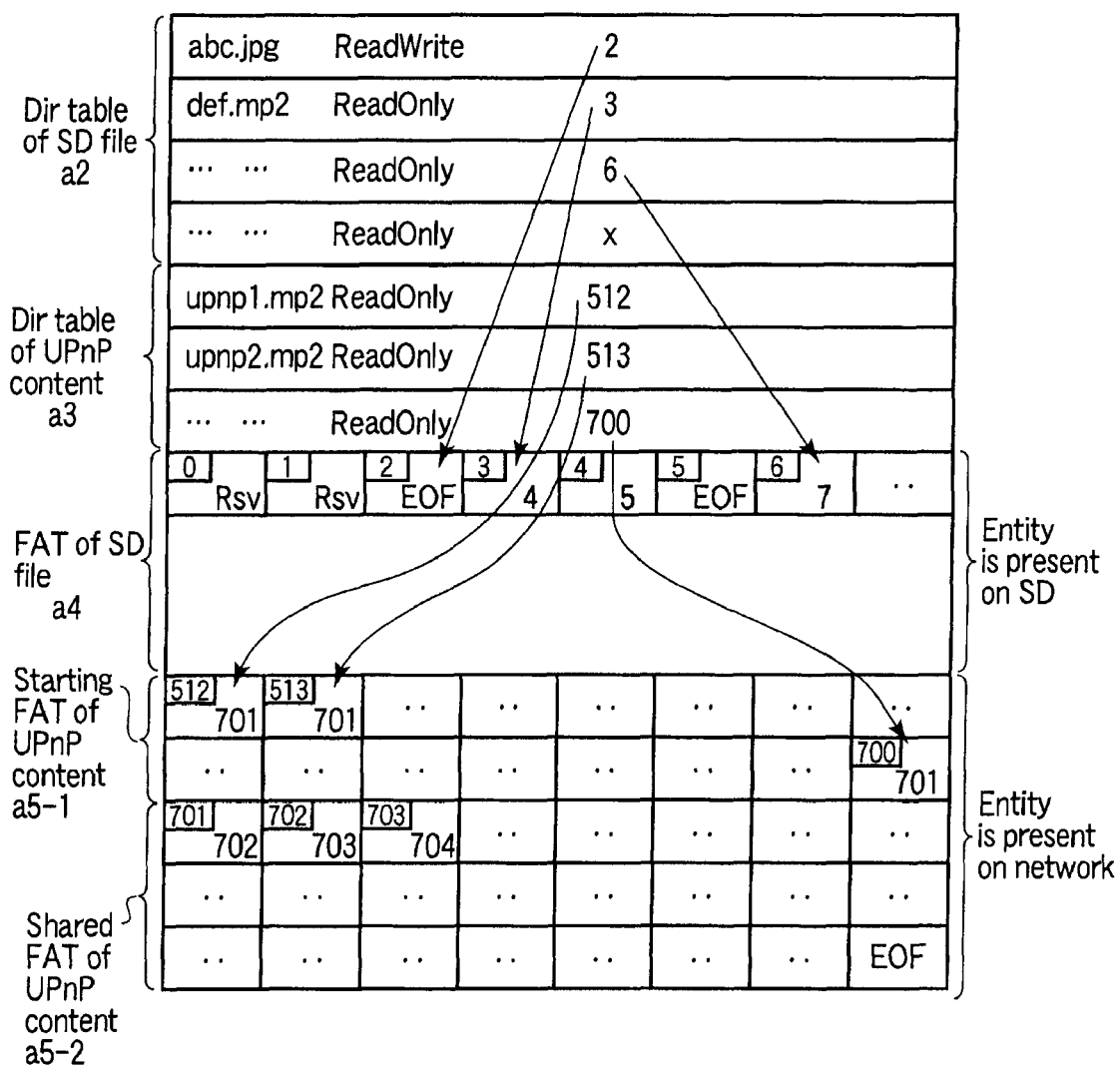
FIG. 11 shows examples of directory entry table and file allocation table included in the file management information storage area shown in FIG. 10.

Next, referring to FIG. 10 and FIG. 11, a description is given of the update control of file management information, which is executed by the card-type wireless communication apparatus 1.

FIG. 10 shows a data structure in the file management information storage area which is secured in the flash memory 11. As shown in FIG. 10, in the file management information storage area, there are provided a Boot area a1 for a boot process; a Dir Table (SD) area a2 for directory entry information relating to each file stored in the data storage area of the flash memory 11; a Dir Table (UPnP) area a3 which stores directory entry information relating to each content data which the UPnP media server can provide; a FAT area a4 which stores a file allocation table relating to files stored in the data storage area of the flash memory 11; and a FAT area a5 which stores a file allocation table relating to each content data which the UPnP media server can provide. The Dir Table (SD) area a2 and the Dir Table (UPnP) area a3 constitute one directory table. The FAT area a4 and the FAT area a5 also constitute one file allocation table. The Dir Table (SD) area a2, the Dir Table (UPnP) area a3, the FAT area a4 and the FAT area a5 constitute one file management information (file system information).

FIG. 11 shows concrete examples of the Dir Table (SD) area a2, the Dir Table (UPnP) area a3, the FAT area a4 and the FAT area a5. The FAT area a5, which is the FAT table for UPnP content, is divided into a starting FAT area a5-1 which represents the storage location (cluster number) of the starting data block of each content data, and a shared FAT area a5-2 which represents the storage locations (cluster numbers) of the second and following data blocks of each content data.

In the present embodiment, the data merge module 14 monitors access from the host apparatus. If the host apparatus accesses a starting sector of certain content data, the data merge module 14 acquires this content data from the external device, and outputs the starting data block of the content data to the host apparatus, and stores the second and following data blocks of the content data in the shared area on the data storage area of the flash memory 11 or in the RAM 17. The shared areas on the data storage area are successive storage areas on the data storage area, which are designated by successive shared cluster numbers 701, 702, 703, . . . , in the shared FAT area a5-2. In the starting FAT area a5-1, a FAT entry, which corresponds to the starting data block (cluster number 512) of the UPnP content "upnp1.mp2", and a FAT entry, which corresponds to the starting data block (cluster number 513) of the UPnP content "upnp2.mp2", are allocated. The FAT entry, which corresponds to cluster number 512, indicates starting shared cluster number 701 in the shared FAT area a5-2 as a storage location of the second data block of the UPnP content "upnp1.mp2". Similarly, the FAT entry, which corresponds to cluster number 513, indicates the starting shared cluster number 701 in the shared FAT area a5-2 as a storage location of the second data block of the UPnP content "upnp2.mp2".

For example, in the case where the host apparatus is to access UPnP content "upnp1.mp2", since the Dir Table describes that "cluster number 512" is the starting cluster, the host apparatus first sends a read request which designates "cluster number 512". The data merge module 14 interprets this read request as an access request to UPnP content "upnp1.mp2", acquires the UPnP content "upnp1.mp2" from the external device, and outputs the starting data block of the UPnP content "upnp1.mp2" to the host apparatus. All the other second and following data blocks of the UPnP content "upnp1.mp2" are stored, for example, in shared storage areas of cluster numbers following "cluster number 701". Since "701" is described as the cluster number, which is to be next read, in the FAT entry corresponding to "cluster number 512" of the starting FAT area a5-1, the host apparatus issues a read request of "cluster number 701". The data merge module 14 interprets this read request as an access request to the subsequent data block of the UPnP content "upnp1.mp2", and outputs to the host apparatus the second data block of the UPnP content "upnp1.mp2", which corresponds to "cluster number 701". Unless the host apparatus issues a read request designating the starting data block (cluster number 513) of other UPnP content "upnp2.mp2", the data merge module 14 recognizes that a read request from the host apparatus to an arbitrary cluster number in the shared FAT area a5-2 is a read request to the UPnP content "upnp1.mp2".

If the data merge module 14 discovers the UPnP media server and discovers content data which this discovered UPnP media server can provide, the data merge module 14 allocates this content data to a free entry in the Dir Table (UPnP) area a3, and secures the FAT entry corresponding to the starting cluster number of this content data on the starting FAT area a5-1.

Taking a concrete example, a description is now given. Assume the case in which a certain UPnP media server has been discovered, and content data "upnp1.mp2" has been discovered as content data which this UPnP media server can provide. In this case, as shown in FIG. 11, the data merge module 14 allocates upnp1.mp2 to one entry of the Dir Table (UPnP) area a3, allocates a free cluster number (e.g. 512) in the starting FAT area a5-1 as the starting cluster number of the upnp1.mp2, and secures the FAT entry corresponding to cluster number 512 on the starting FAT area a5-1. The data merge module 14 sets cluster number 701 in the FAT entry which corresponds to cluster number 512.

Next, a description is given of the access conversion process in a case where the read of this upnp1.mp2 has been requested from the host apparatus.

The host apparatus refers to the file management information shown in FIG. 11, and accesses the file stored in the flash memory 11. In the case of reading out upnp1.mp2, the host apparatus first issues to the card-type wireless communication apparatus 1 a request for data of the starting cluster number, i.e. cluster number "512", which is stored in the entry that is allocated to the upnp1.mp2 of the Dir Table (UPnP) area a3.

When the data merge module 14 of the card-type wireless communication apparatus 1 discovers the UPnP media server and content data and stores file management information relating to this content data in the manner as described above, the data merge module 14 creates and manages a file list as shown in FIG. 12. By referring to this file list, the data merge module 14 recognizes that the requested data is the content data on the UPnP media server. In addition, the data merge module 14 creates and manages a device list, as shown in FIG. 13, in connection with the discovered UPnP media server. Further, with respect to each content data which each UPnP media server can provide, the data merge module 14 creates various information on the basis of the metadata of the content data, for example, according to rules shown in FIG. 14, and stores the various information as directory entry information in the file management information storage area of the flash memory 11. Since the data merge module 14 has the function of creating, from the metadata, the directory entry information relating to the content data which the UPnP media server can provide, the card-type wireless communication apparatus 1 can allow the host apparatus to recognize the content data as files stored in the flash memory 11.

A supplementary description is given of the rules shown in FIG. 14. In the case where content data has a title with more than eight characters, the first eight characters of the title are used as a file name, and a predetermined three-character extension is added according to the kinds of data, i.e. image data, audio data and video data. In addition, "read-only", "archive", or the like, are fixedly set as the attribute of the file.

The file creation date/time, the last access date/time and the update date/time are set such that if such date/time can be obtained from metadata, this date/time is adopted, and if such date/time cannot be obtained from metadata, the date/time at which the metadata of the associated content data is obtained is adopted.

In short, as regards a file that is stored in the flash memory 11, the data merge module 14 has the function of supplementing information which is to be held as a file system, and which cannot be obtained from the metadata and is deficient.

As has been described above, in the case where there occurs information which is to be included in the file management information relating to a file corresponding to content data and which cannot be generated from the acquired metadata, the data merge module 14 supplements such deficient information by generating the information on the basis of predetermined rules.

Referring back to FIG. 12, according to the file list shown in FIG. 12, it is understood that the data of cluster number "512" is the data in URL="192.168.2.10:/Data/Video/Upnp1", that is, the data that is held by "Server-A" according to the device list of FIG. 13. An "Offset" field in the file list shown in FIG. 12 stores an offset value of each content in the case where the UPnP media server has made public the content data as a file system. The data merge module 14 issues to the "Server-A" a request for read-out of data from a location which is found by the following calculation formula:

(designated cluster (from the host apparatus)−(starting cluster (of object content data on the file management information that is secured on the flash memory 11))×cluster size+Offset    formula 1

In the case of reading an arbitrary cluster number in the shared FAT area a5-2, that is, a shared cluster, it should suffice to request from the server a value that is obtained by adding a value corresponding to the data size of the starting cluster to the result of formula 1.

The data merge module 14 transfers to the host apparatus the starting data block in the content data which has been sent from "Server-A". In addition, the data merge module 14 stores the second and following data blocks in the content data, which has been sent from the "Server-A", in the RAM 17 or at shared storage locations beginning with cluster number 701 on the data storage area of the flash memory 11. Subsequently, the host apparatus, which has received the starting data block, refers to the FAT entry corresponding to the cluster of number "512" of the starting FAT area a5-1, and checks the presence/absence of subsequent blocks or the cluster number corresponding to subsequent data block. According to the file management information shown in FIG. 11, it is understood that the subsequent data block is present in the cluster of number "701", and thus the host apparatus issues to the card-type wireless communication apparatus 1 a request for the data of the cluster of number "701". The cluster of number "701" is the second data block in the content data that is designated by the starting cluster number "512". Accordingly, the data merge module 14 outputs to the host apparatus the second data block of the content data that is designated by starting cluster number "512". In the case where the second and following data blocks of the content data, which is designated by the starting cluster number "512", are stored at shared storage locations beginning with the cluster number 701, the data merge module 14 may read the data block from the shared storage location corresponding to the cluster number 701, and may output the data block to the host apparatus.

As described above, the data merge module 14 makes content data providable by a UPnP media server look like files stored in the flash memory 11 of the card-type wireless communication apparatus 1.

In order to make the description of the file management information easy to understand, FIG. 11 shows the example in which the starting cluster number of the discovered content data (e.g. upnp1.mp2) is stored in the entry of Dir Table (UPnP) area a3. However, in the entry of the Dir Table (UPnP) area a3, the directory is also allocated. In this case, this entry stores the number of the cluster in which the information relating to the directory allocated to the entry (e.g. the file name of the file under the directory, and the starting cluster number) is recorded. Thus, the entry of this Dir Table (UPnP) area a3 stores attribute information indicative of whether the directory or the file is allocated. The data merge module 14 allocates the directory to the entry of the Dir Table (UPnP) area a3, and records the information relating to the directory in the corresponding cluster, thereby constructing a tree structure as shown in FIG. 9.

Figure 16:
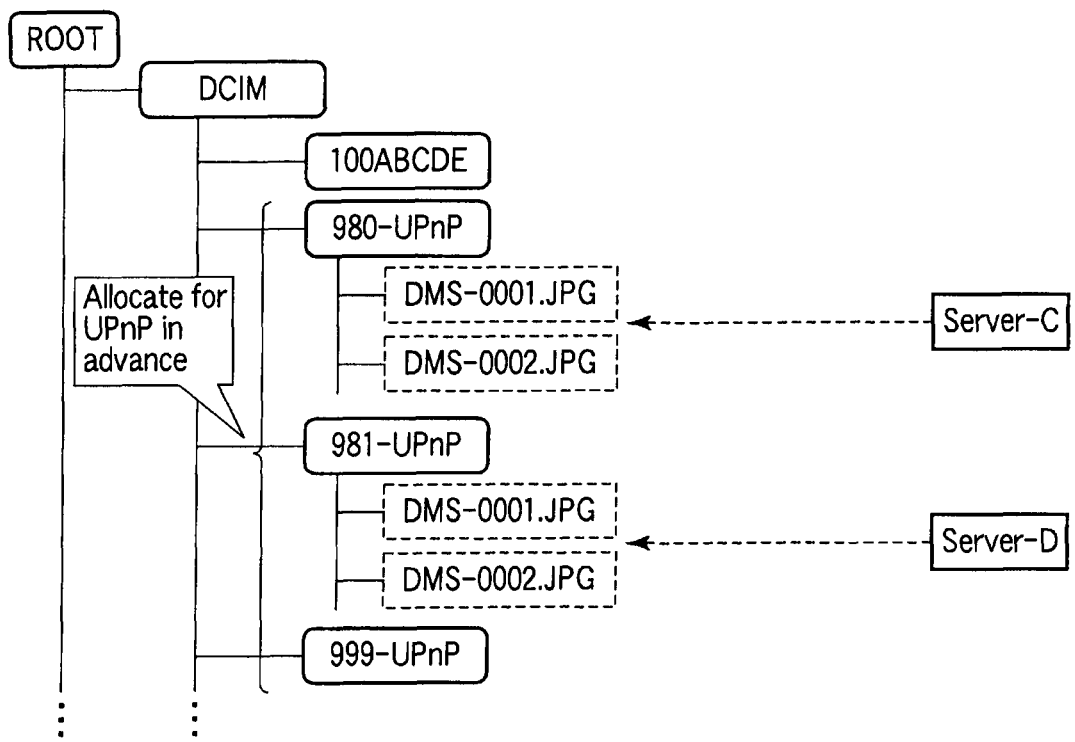
FIG. 16 is an exemplary view for explaining a process of allocating image data on an external device to a file system, which is executed by the electronic apparatus according to the present embodiment.
Figure 17:
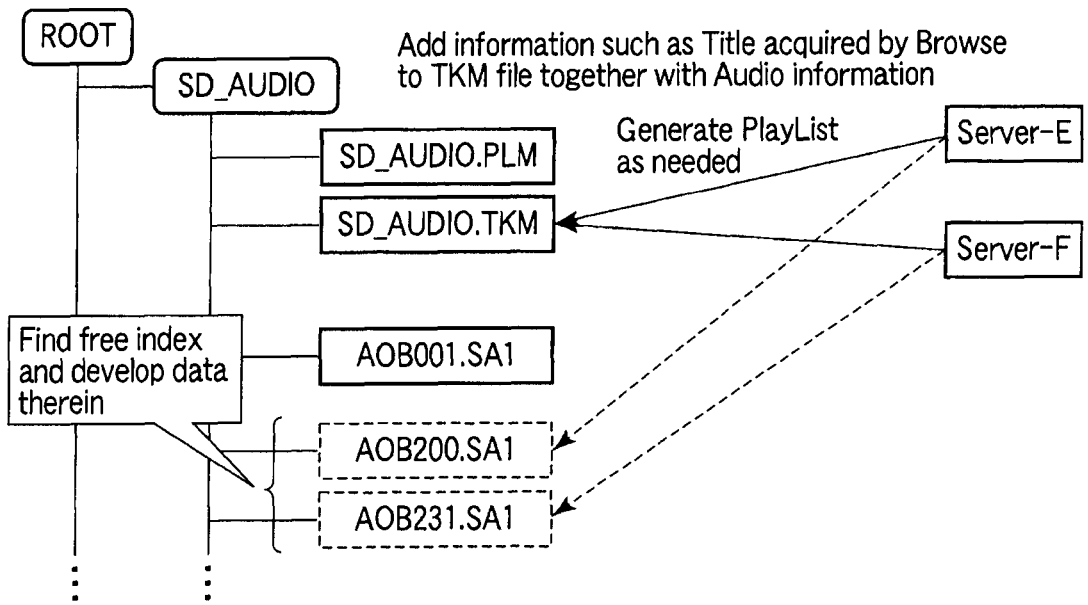
FIG. 17 is an exemplary view for explaining a process of allocating audio data on an external device to a file system, which is executed by the electronic apparatus according to the present embodiment.

Referring to FIG. 15 to FIG. 17, a description is given of a concrete method of allocating image data, audio data and video data to predetermined directories.

As shown in FIG. 15, the card-type wireless communication apparatus 1 allocates in advance, under the "SD_VIDEO" directory, directories for storing content items in, e.g., UPnP media servers, and sets the attribute of the directories to "read only", thereby inhibiting write from the host apparatus. Upon discovering a UPnP media server and content data items, the card-type wireless communication apparatus 1 changes the attribute of an already allocated directory to "writable" and arranges the content items under the directory to allow the host apparatus to access the content data items without being aware that they exist in a plurality of UPnP media servers.

If a UPnP media server has disappeared from the network, a corresponding directory can be deleted to release an entry corresponding to the directory. If more directory entries are necessary, they may be allocated successively.

In the SD-Video standard, content that is handled is content data which is protected in some format, such as CPRM. In the case where video content on the UPnP media server can be converted to a format conforming to the SD-Video standard, this video content is assembled in the file system as a file under the "SD_VIDEO" directory. At a time of playback, the video content is subjected to transcription so that the video content can be viewed.

On the other hand, as regards free video data which is not protected, some other directory, for example, one directory under "DCIM" directory, as shown in FIG. 15, is secured, and the free video data is disposed under this directory so that the free video data may become available.

FIG. 16 is a view for explaining a detailed method of assigning image data of content data providable by a UPnP media server.

As shown in FIG. 16, all image data stored in a UPnP media server are arranged in one directory under the "DCIM" directory. If a plurality of UPnP media servers are present, a directory is allocated for each UPnP media server, and image data are arranged under each directory to make the host apparatus unconscious of switching between the UPnP media servers.

FIG. 17 is a view for explaining a detailed method of assigning audio data of content data providable by a UPnP media server.

The SD Audio standard defines to arrange all files flat in the "SD_AUDIO" directory. Hence, as shown in FIG. 17, each discovered audio data is assigned to a free index found under the "SD_AUDIO" directory. Information about the audio data is added to a management file (TKM file) simultaneously with the assignment.

The SD Audio standard also handles content data protected by a certain method such as CPRM. Hence, free audio data without protection can be arranged under another directory.

As has been described above, the data merge module 14 of the card-type wireless communication apparatus 1 has the function of disposing the content data, which the UPnP media server can provide, under a predetermined directory, according to the directory structure rules for storing in the flash memory 11 various data files of images, audio and video in the SD card.

In other words, the data merge module 14 generates file management information in such a manner that files corresponding to content data may appear on the host apparatus as if these files are stored, according to their kinds, under predetermined directories in the directory structure for classifying files according to kinds and storing the files, the directory structure being constructed on the basis of predetermined rules on the storage medium in the card-type wireless communication apparatus 1.

Next, referring to FIG. 18, a description is given of the procedure of a content information collection process which is executed by the card-type wireless communication apparatus 1. The data merge module 14 executes this content information collection process by using the UPnP control module 13.

To start with, the data merge module 14 executes an initializing process (block S1). Then, in order to discover a UPnP device, the data merge module 14 multicasts a UPnP device information acquisition command to the network by a wireless signal (block S2).

A UPnP device, which has received the UPnP device information acquisition command, sends a response to request participation in the network. The data merge module 14 receives this response as a device participation information report event (block S3, S4). The response from the UPnP device includes device description information. This device description information includes the ID (name) of the UPnP device, the IP address of the UPnP device, the class (media server, media controller, media renderer, etc.) of the UPnP device, the capability of the UPnP device, the kind of media format corresponding to the UPnP device, and the kind of the content protection system corresponding to the UPnP device.

On the basis of the device description information, the data merge module 14 updates the device list information shown in FIG. 13, and adds the discovered UPnP device to the device list information (block S5). Thereafter, the data merge module 14 requests a list of available content from the discovered UPnP device (block S6).

When the state of the UPnP device participating in the network has changed, this UPnP device reports the state change to the card-type wireless communication apparatus 1. The data merge module 14 receives this information as a state change report event (block S3, S7). The data merge module 14 requests a list of available content from the UPnP device that has reported the state change (block S6).

When the data merge module 14 has received the list of available content from the UPnP device (block S8), the data merge module 14 updates the content list information which is indicative of the list of available content with respect to each of individual UPnP devices, and adds the list of received content to the content list information (block S9). The content list, which is sent from the UPnP device, includes metadata with respect to each of individual available content data.

In block S9, the data merge module 14 also executes a process of generating directory entry information and FAT information, which correspond to the content data that is added to the content list information, and adding the generated directory entry information and FAT information to the file management information storage area of the flash memory 11. Thereby, the file management information on the file management information storage area of the flash memory 11 is dynamically updated in accordance with the change of available content data.

When the data merge module 14 has received an error report event from the UPnP device participating in the network (block S10), the data merge module 14 executes a predetermined error process for dealing with an error that has occurred (block S11).

When the available content data has changed due to, e.g. the state change of the UPnP device, the data merge module 14 sends to the host apparatus a signal which is indicative of the occurrence of a reset (card removal) event, thereby to inform the host apparatus of the updated file management information (block S12, S13). The host apparatus re-executes the card device detection process, and re-loads the file management information from the card-type wireless communication apparatus 1. Thereby, the host apparatus can execute access to the card-type wireless communication apparatus 1 in accordance with the updated file management information.

In short, the data merge module 14 has the function of sending to the host apparatus a reset signal for reporting that the removal and re-connection of the card-type wireless communication apparatus 1 have been executed, in the case where the file management information is updated.

Figure 19:
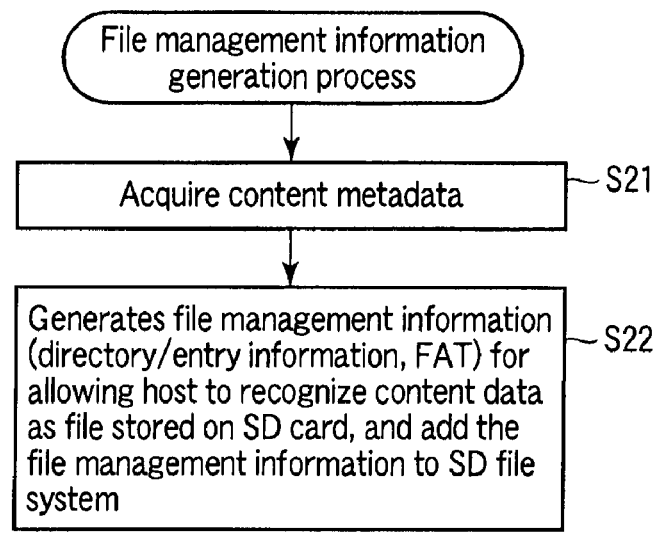
FIG. 19 is an exemplary flowchart illustrating the procedure of a file management information generation process which is executed by the electronic apparatus according to the present embodiment.

Next, referring to a flowchart of FIG. 19, a description is given of the procedure of a file management information generation process which is executed by the data merge module 14.

As has been described with reference to FIG. 18, the data merge module 14 requests a list of content from the discovered external device, and acquires metadata corresponding to content data which the discovered external device can provide (block S21). The data merge module 14 generates file management information (directory entry information for UPnP content, FAT information for UPnP content) for allowing the host apparatus to recognize the content data as files stored in the card-type wireless communication apparatus 1 (SD card), and adds the file management information (directory entry information for UPnP content, FAT information for UPnP content) to the file system for SD (block S22).

In block S22, for example, the starting cluster number, which is indicative of the storage location of the starting data block of the content data, is allocated to the content data. The entry in the starting FAT area a5-1, which is designated by the starting cluster number, indicates the starting cluster number 701 in the shared FAT area as the next cluster number. On the basis of the metadata of the content data and the starting cluster number allocated to the content data, the directory entry information of the content data is generated. This directory entry information is added to the Dir Table (UPnP) area a3 shown in FIG. 11.

Figure 20:
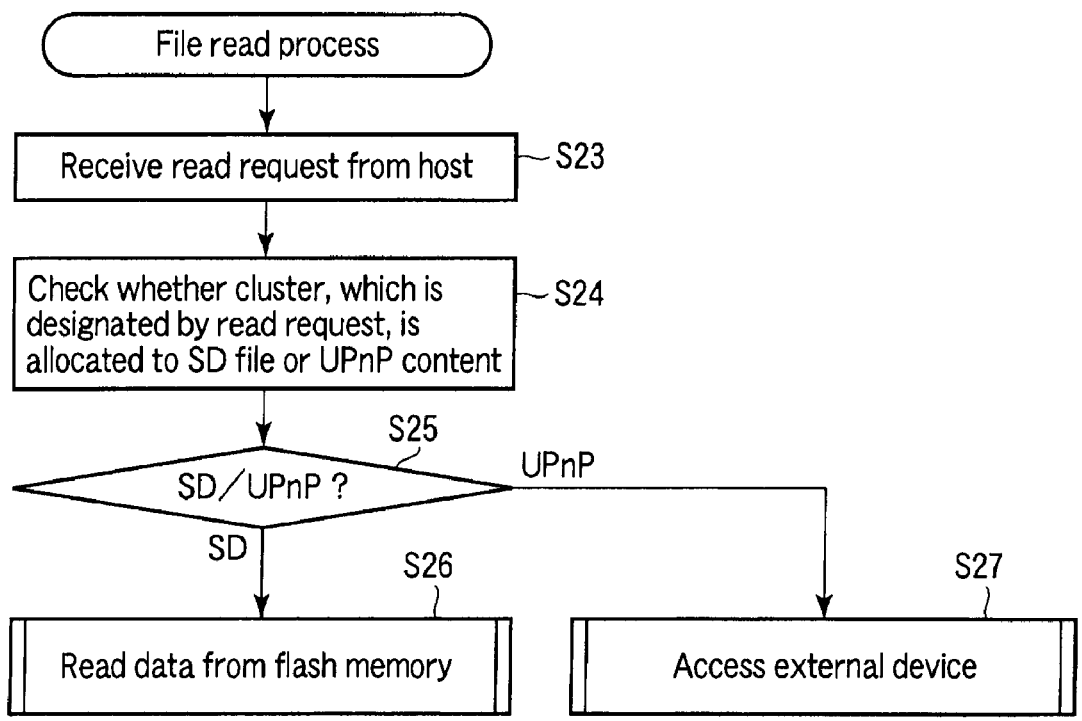
FIG. 20 is an exemplary flowchart illustrating the procedure of a file read process which is executed by the electronic apparatus according to the present embodiment.

Next, referring to FIG. 20, a description is given of the procedure of the file read process which is executed by the data merge module 14.

If the data merge module 14 receives a read request from the host apparatus (block S23), the data merge module 14 first determines whether the cluster (storage location), which is designated by the read request, is a cluster which is allocated to a file stored in the flash memory 11, or a cluster which is allocated as a starting storage location of each content data items which the UPnP media server can provide (block S24).

If the cluster, which is designated by the read request, is a cluster which is allocated to a file stored in the flash memory 11 ("SD" in block S25), the data merge module 14 reads out the data block, which corresponds to this cluster, from the flash memory 11, and transfers the data block to the host apparatus (block S26).

On the other hand, if the cluster, which is designated by the read request, designates any one of starting storage locations (starting clusters) of content data items ("UPnP" in block S25), the data merge module 14 executes the external device access process for acquiring the content data, which corresponds to the starting cluster designated by the read request, from the UPnP media server (block S27).

Figure 21:
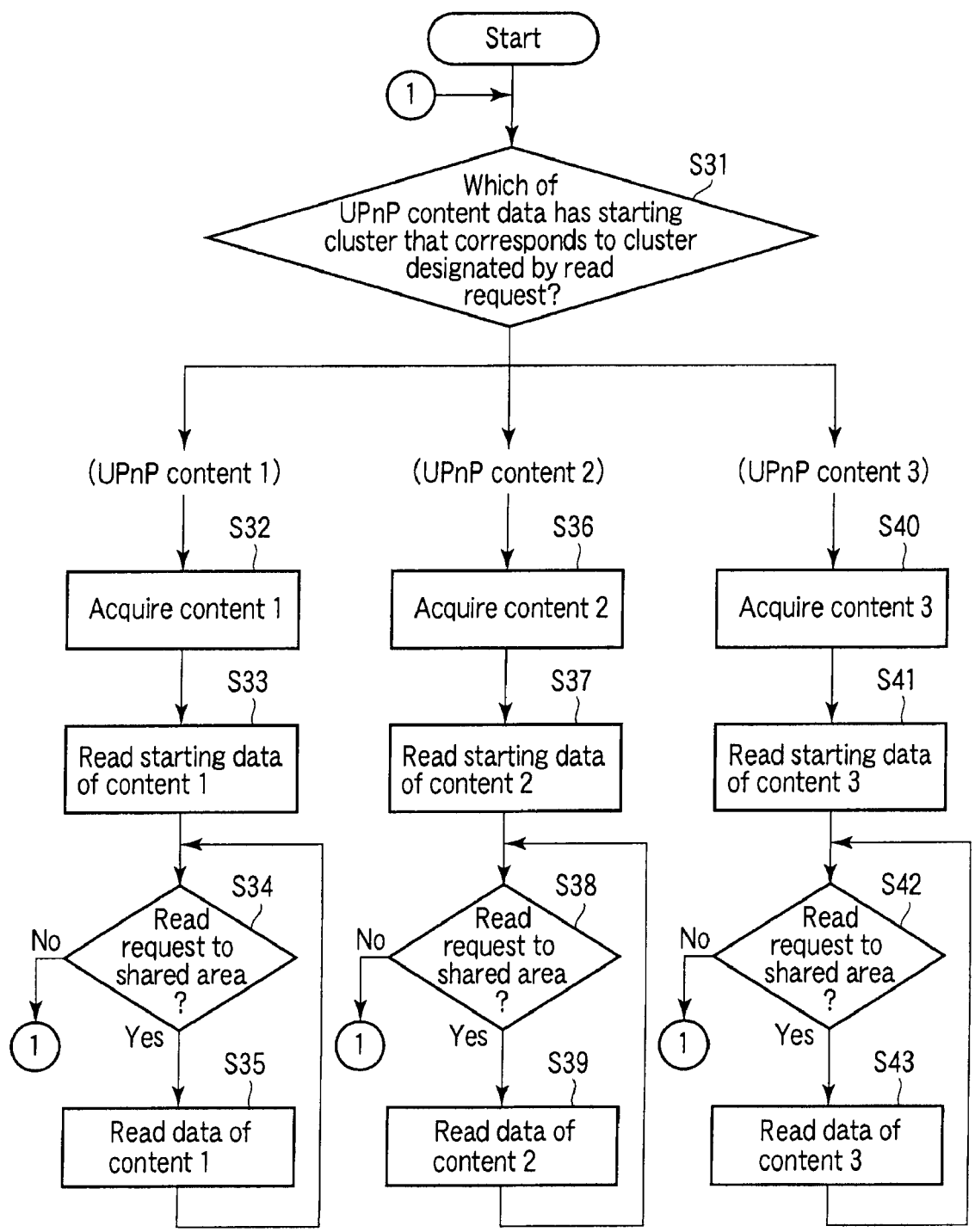
FIG. 21 is an exemplary flowchart illustrating the procedure of an external device access process which is executed by the electronic apparatus according to the present embodiment.

Next, referring to a flowchart of FIG. 21, a description is given of the procedure of the external device access process in block S27.

The data merge module 14 refers to the management table (file list) of FIG. 12, and determines which of the UPnP content data items has the starting cluster that corresponds to the cluster designated by the read request (first read request) from the host apparatus (block S31).

In the case where the cluster designated by the read request corresponds to the starting cluster of a certain UPnP content data (UPnP content 1: upnp1.mp2), the data merge module 14 accesses the external device having the UPnP content 1 (upnp1.mp2), and acquires the UPnP content 1 (upnp1.mp2) from the external device (block S32). The data merge module 14 outputs the starting data block of the UPnP content 1 (upnp1.mp2) to the host apparatus, and stores each of the second and following data blocks of the UPnP content 1 (upnp1.mp2) in the shared data storage area on the flash memory 11 which is indicated by the shared FAT area a5-2 (block S33). In block S33, for example, the starting data block of the UPnP content 1 (upnp1.mp2) is stored in the cluster of number 512, and the second data block, third data block, fourth data block, . . . , of the UPnP content 1 are stored in the cluster of number 701, the cluster of number 702, the cluster of number 703, . . . .

If the data merge module 14 receives the next read request from the host apparatus, the data merge module 14 determines whether the received read request is a read request (second read request) to the shared data storage area on the flash memory 11 which is indicated by the shared FAT area a5-2 (block S34). If the received read request is a read request (second read request) to the shared data storage area (YES in block S34), the data merge module 14 reads the data block in the UPnP content 1, which is stored in the cluster designated by the second read request, and outputs the data block to the host apparatus (block S35).

Each time the read request (second read request) to the shared data storage area is received from the host apparatus, the process of block S35 is repeated.

If the data merge module 14 receives a read request to a cluster other than the shared data storage area, the data merge module 14 refers to the management table (file list) of FIG. 12, and determines which of the UPnP content data has the starting cluster that corresponds to the cluster designated by the read request (first read request) from the host apparatus (block S31).

In the case where the cluster designated by the read request corresponds to the starting cluster of a certain UPnP content data (UPnP content 2: upnp2.mp2), the data merge module 14 accesses the external device having the UPnP content 2 (upnp2.mp2), and acquires the UPnP content 2 (upnp2.mp2) from the external device (block S36). The data merge module 14 outputs the starting data block of the UPnP content 2 (upnp2.mp2) to the host apparatus, and stores each of the second and following data blocks of the UPnP content 2 (upnp2.mp2) in the shared data storage area on the flash memory 11 which is indicated by the shared FAT area a5-2 (block S37). In block S37, for example, the starting data block of the UPnP content 2 (upnp2.mp2) is stored in the cluster of number 513, and the second data block, third data block, fourth data block, . . . , of the UPnP content 2 are stored in the cluster of number 701, the cluster of number 702, the cluster of number 703, . . . .

If the data merge module 14 receives the next read request from the host apparatus, the data merge module 14 determines whether the received read request is a read request (second read request) to the shared data storage area on the flash memory 11 which is indicated by the shared FAT area a5-2 (block S38). If the received read request is a read request (second read request) to the shared data storage area (YES in block S38), the data merge module 14 reads the data block in the UPnP content 2, which is stored in the cluster designated by the second read request, and outputs the data block to the host apparatus (block S39).

In the case where the cluster designated by the read request corresponds to the starting cluster of certain UPnP content data (UPnP content 3: upnp3.mp2), the process of blocks S40 to S43 is executed in the same manner as the above-described process of blocks S32 to S35 and the process of blocks S36 to S39.

In the flowchart of FIG. 21, the description has been given of the case of acquiring content data from the external device when the starting storage area is designated by the read request from the host apparatus. However, for example, when available content data is discovered, the data merge module 14 may acquire the starting data block of each content data from the external device, and may store the starting data block in the data storage area of the flash memory 11. In this case, the storage location on the data storage area, where the starting data block of each content data is stored, is the starting storage location corresponding to the content data. For example, the starting data block of the UPnP content 1 (upnp1.mp2) is stored in the cluster of number 512 on the data storage area, and the starting data block of the UPnP content 2 (upnp2.mp2) is stored in the cluster of number 513 on the data storage area.

When the data merge module 14 has received from the host apparatus the read request for reading the cluster of number 512, the data merge module 14 reads the data block from the cluster of number 512 and outputs the data block to the host apparatus. Further, the data merge module 14 acquires from the external device the second and following data blocks of the UPnP content 1 (upnp1.mp2) and stores the acquired second and following data blocks in the shared data storage area on the flash memory 11 which is indicated by the shared FAT area a5-2. In this case, the second data block, third data block, fourth data block, . . . , of the UPnP content 1 (upnp1.mp2) are stored in the cluster of number 701, the cluster of number 702, the cluster of number 703, . . . .

If the read of the shared data storage area is requested by the subsequent read request, the data merge module 14 reads the data block in the UPnP content 1 (upnp1.mp2) that is stored in the cluster designated by the read request, and outputs the data block to the host apparatus.

As has been described above, in the card-type wireless communication apparatus 1 of the present embodiment, file management information based on which the host apparatus recognizes content data held by an external device as if it were a predetermined file stored in a storage medium in the card-type wireless communication apparatus 1 is generated. The file management information is provided to the host apparatus. Thus, without making any improvement in the file service program of the host apparatus, the host apparatus can be additionally equipped with the function of handling content data of the external device. In addition, in the present embodiment, the file allocation table of the file management information is divided into the starting FAT area and the shared FAT area, and the storage locations of the second and following data blocks of each content data items are managed by using common cluster numbers. Therefore, without using many cluster numbers, a plurality of content data items can be handled as files stored in the storage medium in the card-type wireless communication apparatus 1.

In the present embodiment, the electronic apparatus is realized, by way of example, as the card-type wireless communication apparatus 1 that is a card device. However, the electronic apparatus is not limited to the card device if the electronic apparatus is a device that is configured to be detachably connectable to the host apparatus.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus detachably connected to a host apparatus, comprising:

a wireless communication module configured to communicate wirelessly with at least one external device;

an information retrieving module configured to retrieve, by wireless communication with the at least one external device, metadata corresponding to each of content data items which the at least one external device is able to provide;

a file management information generation module configured to generate, based on each of the retrieved metadata, file management information based on which the host apparatus recognizes each of the content data items as a file stored in a storage medium in the electronic apparatus, the file management information being indicative of a plurality of starting storage locations on the storage medium corresponding to starting data blocks of the content data items, and a plurality of shared storage locations on the storage medium, which are shared by the content data items and correspond to second and following data blocks of each of the content data items; and an access control module configured to retrieve, when the access control module has received a first read request designating one of the plurality of starting storage locations, which is sent from the host apparatus based on the file management information, the content data item corresponding to the designated starting storage location from the at least one external device with use of the wireless communication module, and to output the starting data block of the retrieved content data item to the host apparatus, and configured to output, when one of the plurality of shared storage locations is designated by a subsequent second read request from the host apparatus, the data block in the retrieved content data item, which corresponds to the designated shared storage location, to the host apparatus.

2. The electronic apparatus of claim 1, wherein the file management information generation module is configured to generate single file management information by merging other file management information for managing a file whose entity is stored in the storage medium, said other file management information being indicative of a plurality of storage locations on the storage medium where a plurality of data blocks constituting the file whose entity is stored in the storage medium are stored, and the file management information corresponding to the content data items, and configured to provide the generated single file management information to the host apparatus, and the access control module is configured to read, in a case where a storage location designated by a read request sent from the host apparatus belongs to a range of storage locations managed by said other file management information, the data block of the file, whose entity is stored in the storage medium, from the designated storage location on the storage medium, and configured to output the read data block to the host apparatus.

3. The electronic apparatus of claim 1, wherein the file management information corresponding to the content data items includes directory entry information indicative of a file name, an attribute and a file size of a file corresponding to each of the content data items, and the file management information generation module generates the directory entry information based on the retrieved metadata.

4. The electronic apparatus of claim 1, wherein the electronic apparatus is realized as a card device attachable to a card slot of the host apparatus.

5. An electronic apparatus detachably connected to a host apparatus, comprising:

a wireless communication module configured to communicate wirelessly with at least one external device;

an information retrieving module configured to retrieve, by wireless communication with the at least one external device, each of content data items which the at least one external device is able to provide;

a file management information generation module configured to store starting data blocks of the content data items in a storage medium in the electronic apparatus, and to generate file management information based on which the host apparatus recognizes each of the content data items as a file stored in the storage medium, the file management information being indicative of a plurality of starting storage locations on the storage medium, where the starting data blocks of the content data items are stored, and a plurality of shared storage locations on the storage medium which are shared by the content data items and correspond to second and following data blocks of each of the content data items; and an access control module configured to output, in a case where the access control module has received a first read request which is sent from the host apparatus and designates one of the plurality of starting storage locations on the basis of the file management information, the starting data block of the content data item corresponding to the designated starting storage location to the host apparatus, and to retrieve second and following data blocks of the content data item corresponding to the designated starting storage location from the at least one external device with use of the wireless communication module, and configured to output, in a case where one of the plurality of shared storage locations is designated by a subsequent second read request from the host apparatus, the data block in the retrieved content data item, which corresponds to the designated shared storage location, to the host apparatus.

6. The electronic apparatus of claim 5, wherein the access control module is configured to store the retrieved second and following data blocks at the plurality of shared storage locations on the storage medium, and outputs, in a case where one of the plurality of shared storage locations is designated by the second read request, the data block, which is stored at the designated shared storage location, to the host apparatus.

7. The electronic apparatus of claim 5, wherein the electronic apparatus is realized as a card device attachable to a card slot of the host apparatus.

8. A content data providing method which executes, by an electronic apparatus which is detachably connected to a host apparatus, a process of providing content data, which is held by an external device, to the host apparatus as a file, comprising:

executing wireless communication with at least one external device by a wireless communication device within the electronic apparatus, thereby retrieving metadata corresponding to each of the content data items which the at least one external device is able to provide;

generating, based on the retrieved metadata, file management information based on which the host apparatus recognizes each of the content data items as a file stored in a storage medium in the electronic apparatus, the file management information being indicative of a plurality of starting storage locations on the storage medium corresponding to starting data blocks of the content data items, and a plurality of shared storage locations on the storage medium, which are shared by the content data items and correspond to second and following data blocks of each of the content data items; and retrieving, in a case where a first read request designating one of the plurality of starting storage locations, which is sent from the host apparatus based on the file management information, is received, the content data item corresponding to the designated starting storage location from the at least one external device with use of the wireless communication device, and outputting the starting data block of the retrieved content data item to the host apparatus, and outputting, in a case where one of the plurality of shared storage locations is designated by a subsequent second read request from the host apparatus, the data block in the retrieved content data item, which corresponds to the designated shared storage location, to the host apparatus.

9. The content data providing method of claim 8, wherein said generating the file management information includes generating single file management information by merging other file management information for managing a file whose entity is stored in the storage medium, said other file management information being indicative of a plurality of storage locations on the storage medium where a plurality of data blocks constituting the file whose entity is stored in the storage medium are stored, and the file management information corresponding to the content data items, and providing the generated single file management information to the host apparatus, and the method further comprises reading, in a case where a storage location designated by a read request sent from the host apparatus belongs to a range of storage locations managed by said other file management information, the data block of the file, whose entity is stored in the storage medium, from the designated storage location on the storage medium, and outputting the read data block to the host apparatus.

10. The content data providing method of claim 8, wherein the file management information corresponding to the content data items includes directory entry information indicative of a file name, an attribute and a file size of a file corresponding to each of the content data items, and said generating the file management information includes generating the directory entry information based on the retrieved metadata.

* * * * *